(12) United States Patent
Aldana et al.

(10) Patent No.: US 8,654,892 B2
(45) Date of Patent: *Feb. 18, 2014

(54) MULTIPLE TRANSMIT ANTENNA INTERLEAVER DESIGN

(71) Applicants: Carlos H. Aldana, Sunnyvale, CA (US); Amit G. Bagchi, Mountain View, CA (US); Min Chuin Hoo, Mountain View, CA (US)

(72) Inventors: Carlos H. Aldana, Sunnyvale, CA (US); Amit G. Bagchi, Mountain View, CA (US); Min Chuin Hoo, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,850

(22) Filed: Jan. 30, 2013

(65) Prior Publication Data

US 2013/0142280 A1    Jun. 6, 2013

Related U.S. Application Data

(63) Continuation of application No. 13/372,703, filed on Feb. 14, 2012, now Pat. No. 8,391,387, which is a continuation of application No. 11/137,259, filed on May 25, 2005, now Pat. No. 8,139,659.

(60) Provisional application No. 60/574,108, filed on May 25, 2004, provisional application No. 60/582,223, filed on Jun. 22, 2004, provisional application No. 60/587,315, filed on Jul. 13, 2004.

(51) Int. Cl.
*H04L 27/00* (2006.01)

(52) U.S. Cl.
USPC ........... 375/299; 375/267; 375/260; 375/261; 375/295; 375/285; 455/102; 455/103; 370/208; 370/210; 714/752; 714/748; 714/787; 714/762; 714/788

(58) Field of Classification Search
USPC ............... 375/267, 260, 261, 295, 285, 299; 455/102, 103; 370/208, 210; 714/752, 714/748, 787, 762, 788
See application file for complete search history.

(56) References Cited

U.S. PATENT DOCUMENTS

| | | | | |
|---|---|---|---|---|
| 7,573,946 B2* | 8/2009 | Sandhu | | 375/267 |
| 8,139,659 B2* | 3/2012 | Aldana et al. | | 375/260 |
| 8,391,387 B2* | 3/2013 | Aldana et al. | | 375/260 |
| 2004/0151109 A1* | 8/2004 | Batra et al. | | 370/208 |
| 2004/0268207 A1* | 12/2004 | Sharma | | 714/763 |

* cited by examiner

*Primary Examiner* — Siu Lee

(74) *Attorney, Agent, or Firm* — Garlick & Markison; Bruce E. Garlick

(57) ABSTRACT

An arrangement of interleavers allocates bits from an input symbol across sub-symbols transmitted via sub-carriers of multiple orthogonal frequency division multiplex (OFDM) carriers. The input bits are allocated in a fashion to provide separation across subcarriers, and rotation of sub-symbols across the OFDM carriers provides additional robustness in the present of signal path impairments.

20 Claims, 15 Drawing Sheets

US 8,654,892 B2

MULTIPLE TRANSMIT ANTENNA INTERLEAVER DESIGN

CROSS REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 13/372,703 entitled "Multiple Transmit Antenna Interleaver Design,", filed Feb. 14, 2012, pending, which application claims priority pursuant to U.S. 35 U.S.C. §120, as a continuation of U.S. Utility application. Ser. No. 11/137,259, filed May 25, 2005, now U.S. Pat. No. 8,139,659, which makes reference to, claims priority to, and claims benefit of U.S. Provisional Patent Application Ser. No. 60/574,108, entitled "Multiple Transmit Antenna Interleaver Design" US01 BP3690), filed May 25, 2004, U.S. Provisional Patent Application Ser. No. 60/582,223, entitled "Multiple Transmit Antenna Interleaver Design" US01 BP3690.1), filed Jun. 22, 2004, and U.S. Provisional Patent Application Ser. No. 60/587,315, entitled "Multiple Transmit Antenna Interleaver Design" US01 BP3690.2), filed Jul. 13, 2004, the complete subject matter of each of which is hereby incorporated herein by reference, in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Simple receivers assume independent noise samples at each time instant and independent channel fades. In reality, bursts of errors occur and the channels at different time instants are correlated. Convolutional coded data, for example, can only handle small bursts of errors. The goal of an interleaver is to randomize the transmitted data stream so as to make decoding at the receiver simple. A well-designed interleaver spreads the error burst over time so that the convolutional code can handle it. Wireless LAN systems currently exploit the frequency dimension and do not take advantage of the time dimension. This is due to the large coherence time of the channel and the inherent delay that would be associated with an interleaver that took advantage of both frequency and time dimensions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for interleaving data for transmission over multiple antennas, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the transmission of data over a medium subject to fading and noise. More specifically, certain aspects of the present invention pertain to a method of interleaving bits of a sequence of data bits for transmission via radio frequency signals using multiple transmit antennas. Although embodiments of the present invention are described below with respect to applications in transmitting a sequence of data bits via a particular exemplary radio frequency wireless communication system, an embodiment of the present invention is not limited in this regard, and may have utility with regard to other communication mechanisms such as, for example, optical communication, without departing from the spirit or scope of the present invention. In addition, the following discussion makes reference to exemplary embodiments employing a particular number (e.g., 48) of subcarriers (also known as "tones") in an orthogonal frequency division multiplex signal. The number of subcarriers used herein in illustrating aspects of the present invention is not intended to represent a specific limitation of the present invention. The examples of the text and figures are provided for illustrative purposes only, as a greater or lesser number of subcarriers may be employed without departing from the spirit and scope of the present invention.

Figure 1:
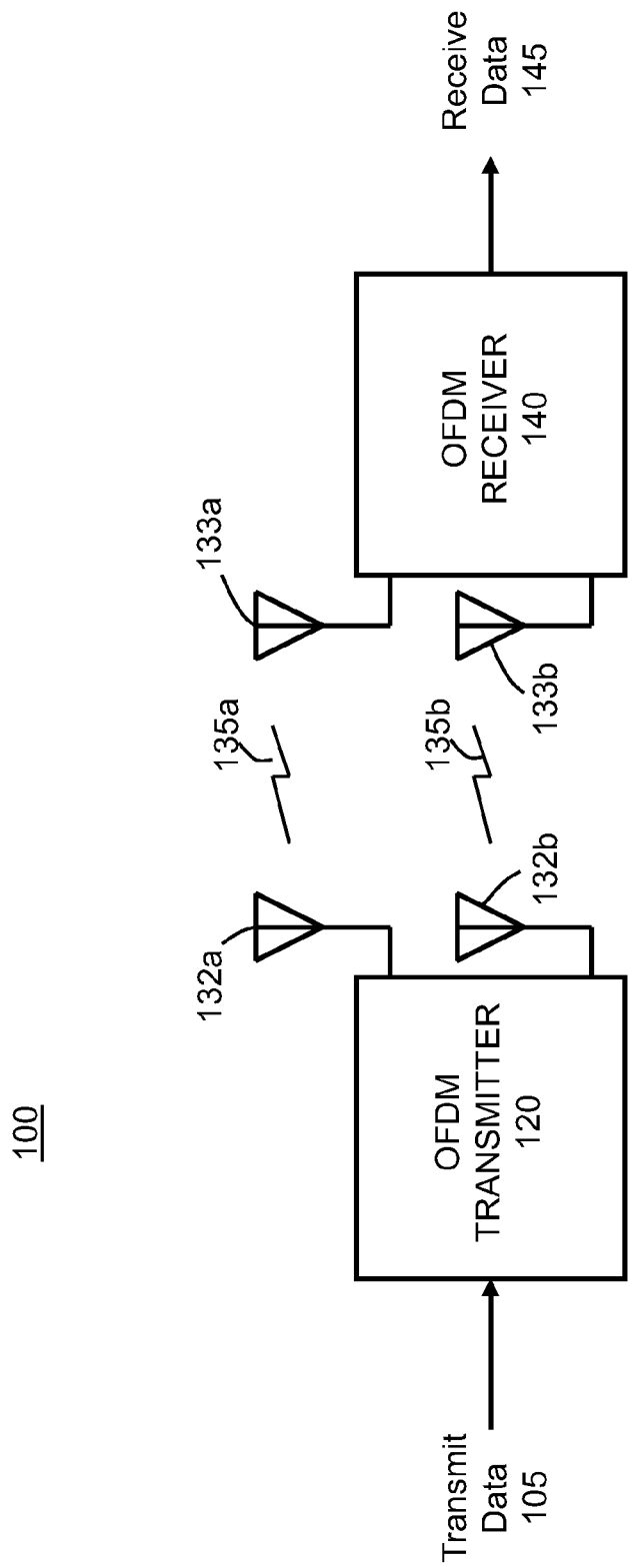
FIG. 1 shows a high-level block diagram of an exemplary communication system in which a representative embodiment of the present invention may be practiced.

FIG. 1 shows a high-level block diagram of an exemplary communication system 100 in which a representative embodiment of the present invention may be practiced. As shown in FIG. 1, the communication system 100 comprises a radio frequency (RF) transmitter 120 employing orthogonal frequency division multiplexing (OFDM) to transmit a sequence of data bits 105. The OFDM transmitter 120 shown in FIG. 1 employs multiple transmit antennas 132*a*, 132*b* to convey RF signals 135*a*, 135*b* to receiving antennas 133*a*, 133*b* connected to an OFDM receiver 140. The OFDM receiver 140 converts the received RF signal to a sequence of received data bits 145. Although the OFDM transmitter 120 is shown as having two transmit antennas 132*a*, 132*b*, this is for illustrative purposes only and does not represent a limitation of the present invention. A greater number of transmit antennas may be employed without departing from the spirit or scope of the present invention.

Figure 2:
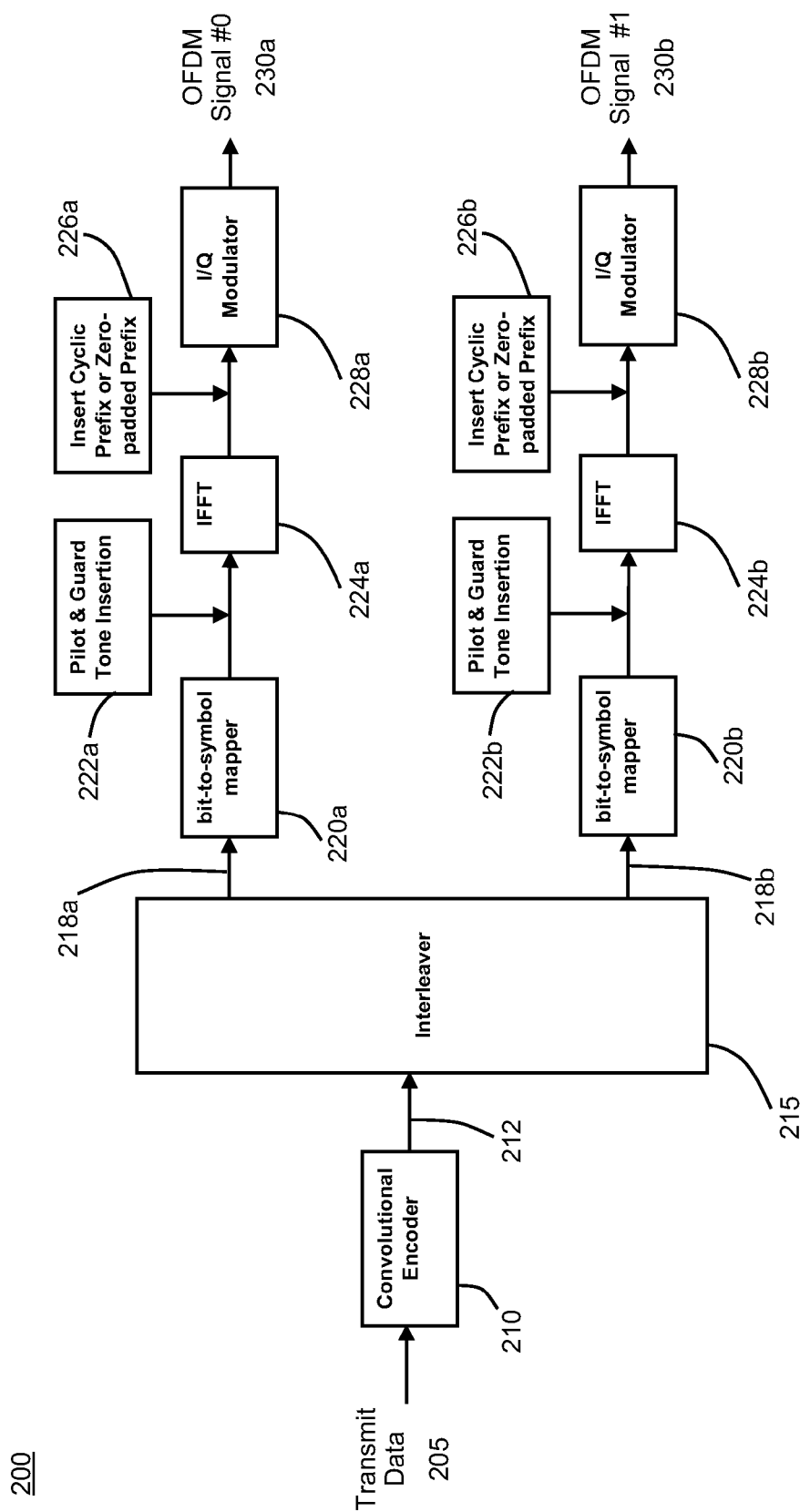
FIG. 2 shows a block diagram of an exemplary communication system that may correspond, for example, to a portion of the OFDM transmitter shown in FIG. 1 for processing a sequence of transmit data bits for transmission as two OFDM signals #0 and #1, in accordance with a representative embodiment of the present invention.

FIG. 2 shows a block diagram of an exemplary communication system 200 that may correspond, for example, to a portion of the OFDM transmitter 120 shown in FIG. 1 for processing a sequence of transmit data bits 205 for transmission as two OFDM signals #0 230*a* and #1 230*b*, in accordance with a representative embodiment of the present invention. As illustrated in FIG. 2, the communications system 200 comprises a combination of functional blocks including a convolutional encoder block 210, an interleaver block 215, bit-to-symbol mapper blocks 220*a*, 220*b*, pilot and guard tone insertion blocks 222*a*, 222*b*, inverse fast Fourier transform (IFFT) blocks 224*a*, 224*b*, prefix insertion blocks 226*a*, 226*b*, and I/Q modulator blocks 228*a*, 228*b*. It is a function of the communication system 200 of FIG. 2 to process the sequence of transmit data bits 205 into two orthogonal frequency division multiplex (OFDM) signals 230*a*, 230*b* for transmission via radio frequency carriers such as, for example, the RF paths 135*a*, 135*b* of FIG. 1. The convolutional encoder 210 receives the sequence of transmit data bits 205 and produces an encoded output 212 that is then passed to the interleaver block 215. The interleaver block 215 distributes interleaved and grouped sequences of sub-symbols of transmit streams 218*a*, 218*b* to bit-to-symbol mappers 220*a*, 220*b*, respectively. For each of the transmits streams 218*a*, 218*b*, a subsequence exists that corresponds to a set of bits to be transmitted. The bit-to-symbol mappers 220*a*, 220*b* may pass, for example, mappings to inverse fast Fourier transform blocks 224*a*, 224*b*, respectively. Signals from pilot and guard tone insertion blocks 222*a*, 222*b* are also combined with the signals being transformed. The outputs of the inverse fast Fourier transform blocks 224*a*, 224*b* are combined with signals from prefix insertion blocks 226*a*, 226*b* and passed to I/Q modulator blocks 228*a*, 228*b*, respectively, to produce OFDM signals #0 230*a* and #1 230*b*.

Although the communication system 200 illustrated in FIG. 2 comprises a particular arrangement of functional blocks for communicating the sequence of transmit data bits 205 using two transmit antennas, this is for illustrative purposes only and does not represent a specific limitation of the present invention. A different arrangement or number of components supporting transmission using a greater number of transmit antennas may be employed without departing from the spirit or scope of the present invention.

Figure 3:
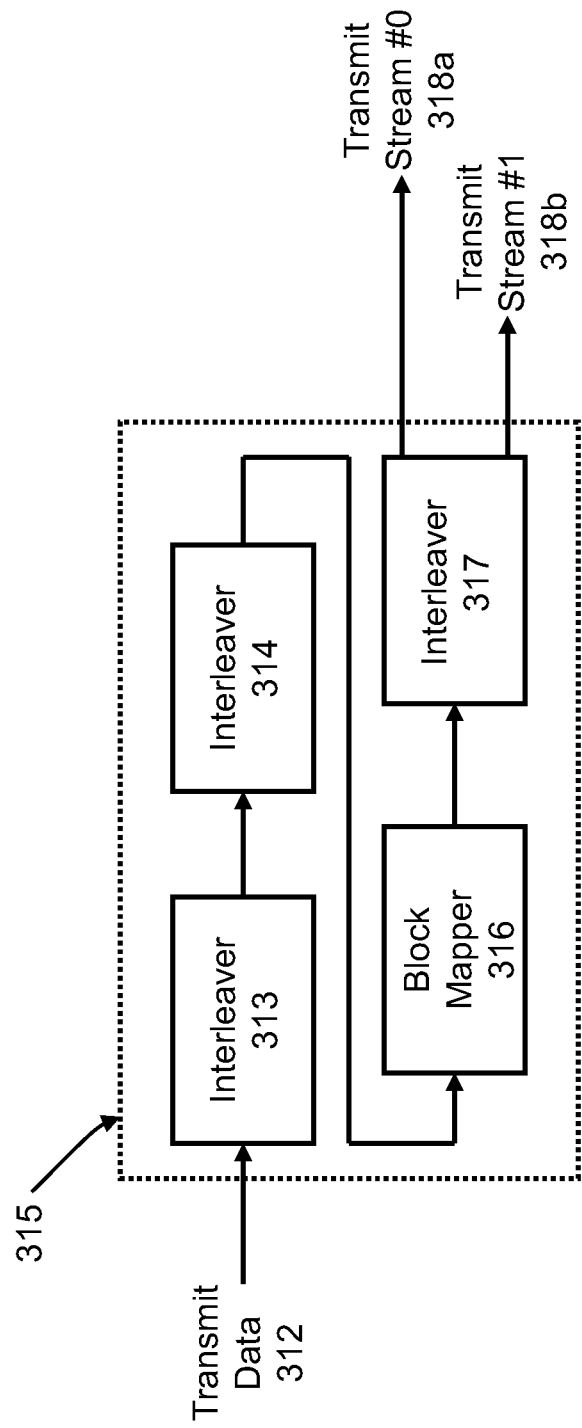
FIG. 3 shows a block diagram of an exemplary interleaver block that may correspond, for example, to the interleaver block of FIG. 2 for processing a sequence of data bits for transmission using two transmit antennas, in accordance with a representative embodiment of the present invention.

FIG. 3 shows a block diagram of an exemplary interleaver block 315 that may correspond, for example, to the interleaver block 215 of FIG. 2 for processing a sequence of data bits for transmission using two transmit antennas, in accordance with a representative embodiment of the present invention. The interleaver block 315 of FIG. 3 comprises a first interleaver 313, a second interleaver 314, a block mapper 316, and a third interleaver 317. Although the interleaver block 315 is shown as having a particular number and arrangement of interleavers and block mappers, a greater or lesser number of interleavers and block mappers may be employed without departing from the spirit and scope of the present invention. In a representative embodiment of the present invention, the interleaver 315 may be defined by a process having four steps corresponding to the first interleaver 313, the second interleaver 314, the block mapper 316, and the third interleaver 317 shown in FIG. 3. A sequence of transmit data bits 312 that may correspond, for example, to the output of an encoder such as the output 212 of the encoder 210 of FIG. 2, may be interleaved by a block interleaver using a block size corresponding to the number of bits in a single orthogonal frequency division multiplex (OFDM) symbol (N*$N_{CBPS}$) to produce transmit streams #0 318a and #1 318b. The transmit streams #0 318a and #1 318b may correspond, for example, to the transmit stream 218a and 218b of the interleaver 215 of FIG. 2. For each of the streams 318a, 318b a subsequence exists that corresponds to a set of bits to be transmitted. In a representative embodiment of the present invention, the permutations of the interleavers 313, 314, 316, 317 may comprise permutations defined in the Institute of Electrical and Electronics Engineers, Inc. (IEEE) 802.11a and 802.11g standards. Details of the IEEE 802.11a standard may be found in IEEE Std 802.11a-1999, also re-designated as ISO/IEC 8802-11:1999/Amd 1:2000(E), the complete subject matter of which is hereby incorporated herein by reference, in its entirety. Details of the IEEE 802.11g standard may be found in IEEE Std 802.11g-2003 (Amendment to IEEE Std 802.11, 1999 Edition (Reaffirmed 2003) as amended by IEEE standards 802.11a-1999, 802.11b-1999, 802.11b-1999/Cor 1-2001, and 802.11d-2001), the complete subject matter of which is hereby incorporated herein by reference, in its entirety.

In the following discussion of various aspects of the present invention, the parameters shown below may be defined:

$N_{CBPS}$ Number of bits per (OFDM) symbol
N: Number of data streams to be transmitted
B: Number of bits per subcarrier
K: Number of subcarriers per (OFDM) symbol
r: Interleaving depth or "base"

In a representative embodiment of the present invention, interleaver 313 of FIG. 3 may perform a first permutation upon the bits of the input symbol according to the following formula:

$$i = \frac{BKN}{r}(k \bmod r) + \left\lfloor \frac{k}{r} \right\rfloor \quad (1)$$
$$k = 0, 1, \ldots BKN - 1$$

where k denotes the index of the input bits as they enter the interleaver, i denotes the index of the $k^{th}$ input bit in the output of interleaver 313, and $\lfloor \bullet \rfloor$ denotes the floor operation (i.e., having a value equal to the largest integer not exceeding the argument). For an interleaver such as, for example, interleaver 313 operating according to the IEEE 802.11a or IEEE 802.11g standards in which BPSK is used with K=48 subcarriers (also known as "tones"), the above formula becomes:

$$i = 3(k \bmod 16) + \left\lfloor \frac{k}{16} \right\rfloor$$
$$k = 0, 1, \ldots 47$$

while the formula for the use of QPSK becomes:

$$i = 6(k \bmod 16) + \left\lfloor \frac{k}{16} \right\rfloor$$
$$k = 0, 1, \ldots 95$$

Use of the above permutations result in a three tone separation between adjacent input bits in the output stream.

In a representative embodiment of the present invention, interleaver 314 of FIG. 3 may perform a second permutation upon the output bits of interleaver 313 according to the following formula:

$$j = s \left\lfloor \frac{i}{s} \right\rfloor + \bmod \left( i + BKN - \left\lfloor \frac{ri}{BKN} \right\rfloor, s \right), \quad (2)$$
$$i = 0, 1, \ldots BKN - 1$$

where s=max(B/2,1), i denotes the index of the input bits as they enter interleaver 314, j denotes the index of the $i^{th}$ input bit in the output of interleaver 314, and r denotes the depth or "base", as described above. The number of data subcarriers (also known as "tones"), K, may be related to the number of bits per subcarrier B, and the number of bits per (OFDM) symbol $N_{CBPS}$ by the formula:

$$K = \frac{N_{CBPS}}{B}.$$

In a representative embodiment of the present invention, a block mapper, shown as the block mapper 316 in FIG. 3, may ensure that bits are spread across the transmit streams before being spread across subcarriers, and may group one or more sub-symbols into blocks. Bits from the output of interleaver 314 may be grouped into sub-symbols of size B, and the sub-symbols may be grouped into blocks of size $$\frac{K}{rot},$$

where rot is as defined below.

In a representative embodiment of the present invention, the parameter rot may determine the width of a data block within a transmit stream such as, for example, the transmit stream #0 318a of FIG. 3. In a representative embodiment of the present invention, the value of the parameter rot may be selected as any divisor of K (i.e., the number of subcarriers or "tones") that is greater than or equal to the number of transmit streams, N. The width of a data block is then given by $$\frac{K}{rot},$$

and the number of data blocks transmitted via each stream is equal to rot. In a representative embodiment of the present invention, a block p may comprise sub-symbols $$\left\{ \frac{Kp}{rot}, \frac{Kp}{rot} + 1, \ldots, (p+1)\frac{K}{rot} - 1 \right\}$$
$$\text{for } 0 \leq p \leq N * rot - 1.$$

In a representative embodiment of the present invention, the interleaver 317 may function to swap or rotate sub-symbols between a first subsequence for a first transmit stream such as, for example, the transmit stream 318a, and a second subsequence for a second transmit stream such as, for example, the transmit stream 318b.

Figure 3A:
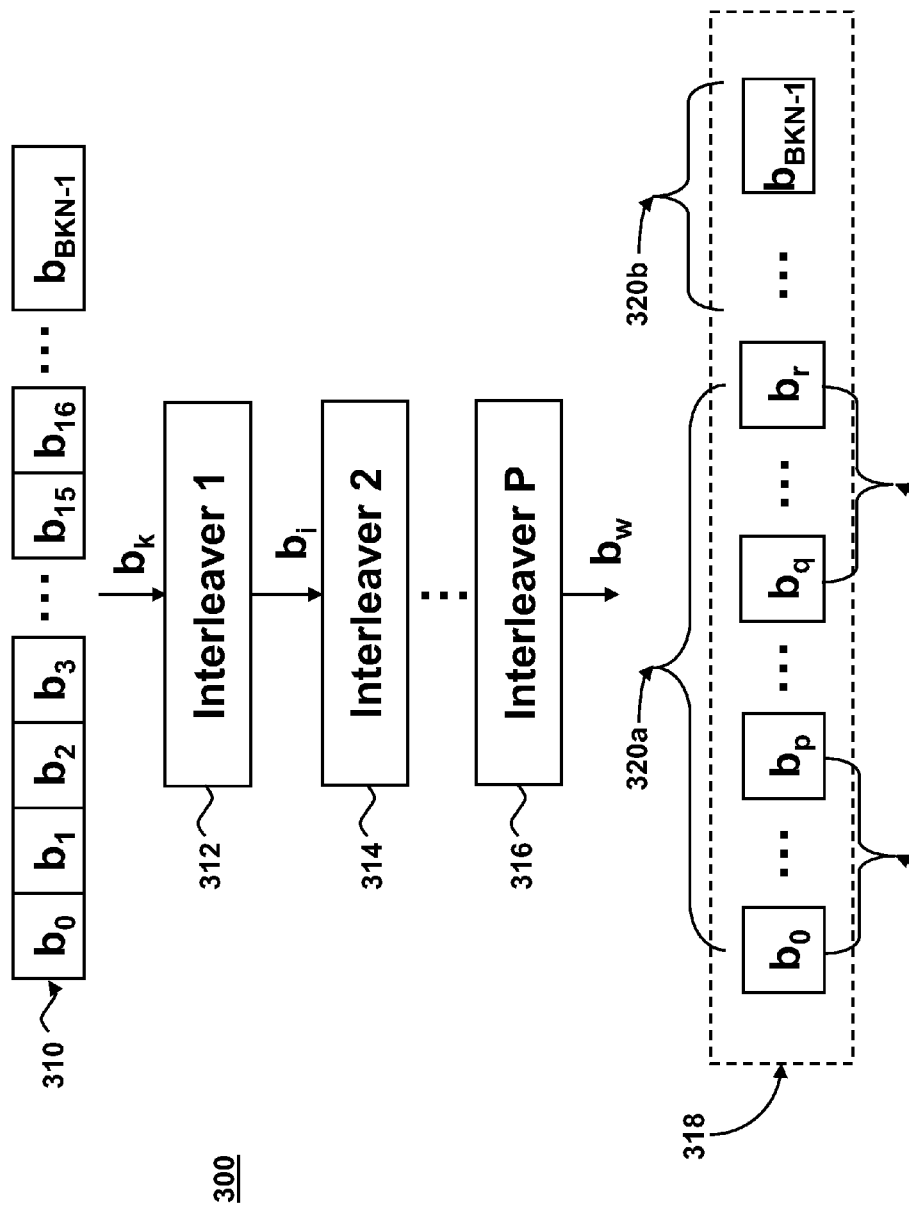
FIG. 3A illustrates an exemplary interleaver block processing the bits of an input symbol to produce two transmit streams #0 and #1 that may correspond, for example, to the transmit streams #0 and #1, respectively, of FIG. 3, in which a representative embodiment of the present invention may be practiced.

FIG. 3A shows a block diagram of an exemplary interleaver block 300 for processing a block of input bits 310 to a sequence of output bits 318 for transmission over multiple transmit streams, in accordance with a representative embodiment of the present invention. The interleaver 300 shown in FIG. 3A comprises a series of interleavers represented in FIG. 3A by interleavers 312, 314, 316 for converting the block of input bits 310 to the output bit sequence 318. Although three interleavers are shown in the illustration of FIG. 3A, a different number of interleavers may be employed without departing from the spirit or scope of the present invention. The sequence of interleavers 312, 314, 316 may, for example, perform the functionality represented by the interleaver block 315 of FIG. 3. The sequence of output bits 318 shown in FIG. 3A comprises a number of subsequences such as subsequences 320a, 320b, each subsequence designated for transmission using a separate transmit stream such as, for example, the transmit streams #0 318a, #1 318b of FIG. 3. For example, in a representative embodiment of the present invention in which two transmit streams are used, the output bit sequence 318 may comprise two subsequences 320a, 320b, where each of subsequences 320a, 320b are designated for transmission via one of the two transmit streams.

In a representative embodiment of the present invention, bits within a subsequence such as, for example, the subsequence 320a may be arranged into multiple groups or sub-symbols 322, 324, where each sub-symbol is allocated for transmission via one of the subcarriers or "tones" of an OFDM signal such as, for example, the OFDM signals 230a, 230b shown in FIG. 2. For example, in a representative embodiment of the present invention in which binary phase shift keyed (BPSK) modulation is employed for each subcarrier, each of the groups 322, 324 may comprise one bit of the sequence of output bits 318. In a representative embodiment in which quadrature phase shift keyed (QPSK) modulation is employed for each subcarrier, each of the groups 322, 324 may comprise two bits of the sequence of output bits 318. In a system in which K subcarriers or tones are employed, the size of the subsequence 320a may be K bits using, for example, BPSK, and 2*K bits when QPSK is used. The total number of bits in each of the block of input bits 310, and the sequence of output bits 318 may be calculated as B*K*N, where B is the number of bits per sub-symbol, K is the number of subcarriers (also known as "tones") in each OFDM signal, and N is the number of transmit streams.

Figure 4:
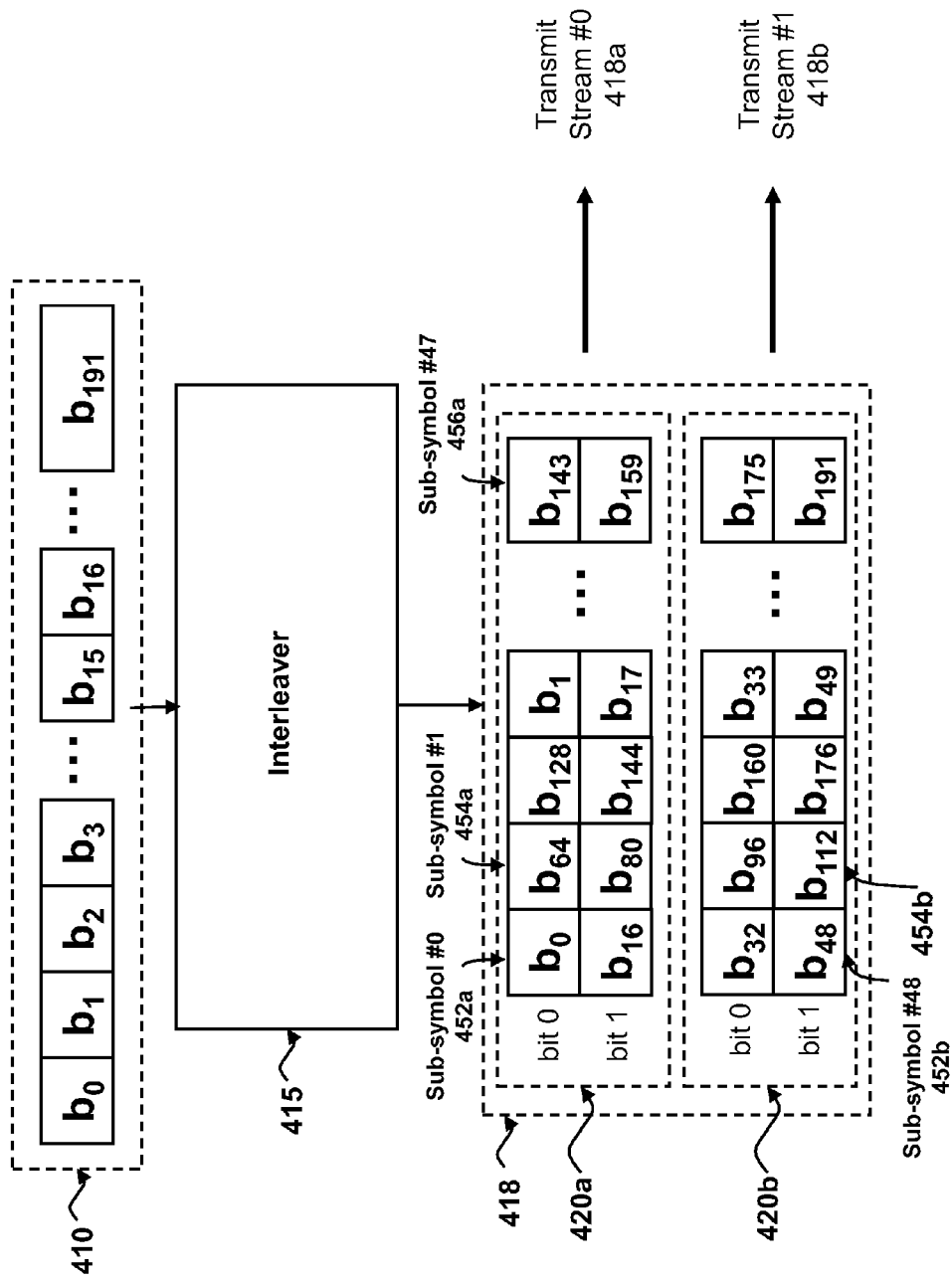
FIG. 4 shows a block diagram of an exemplary interleaver block for processing a block of input bits to a sequence of output bits for transmission over multiple transmit streams, in accordance with a representative embodiment of the present invention.

FIG. 4 illustrates an exemplary interleaver block 415 processing the bits of an input symbol 410 to produce two transmit streams #0 418a and #1 418b that may correspond, for example, to the transmit streams #0 318a and #1 318b, respectively, of FIG. 3, in which a representative embodiment of the present invention may be practiced. The illustration of FIG. 4 represents an arrangement using 48 (i.e., K=48) subcarriers (also known as "tones"), employing quadrature phase-shift keying (QPSK) (i.e., B=2), and two transmit streams, #0 318a and #1 318b (i.e., N=2). Because the number of transmit streams, N is equal to 2, and the number of subcarriers per OFDM symbol, K, is equal to 48, there are a total of 96 (i.e., K*N) sub-symbols per input symbol. The first subcarrier of transmit stream #0 418a comprises sub-symbol #0 452a, which is composed of input symbol 410, bits 0 and 16. The next subcarrier comprises sub-symbol #1 454a, which is composed of input symbol 410, bits 64 and 80. The last subcarrier of stream #0 418a comprises sub-symbol #47 456a, which is composed of input symbol 410, bits 143 and 159. The first sub-symbol #48 452b of transmit stream #1 418b is composed of input symbol 410, bits 32 and 48. The last subcarrier of stream #1 418b comprises sub-symbol #95 456b, which is composed of input symbol 410, bits 175 and 191. The collection of sub-symbols #0 452a through #95 456b may then be grouped into data blocks as described below.

In a representative embodiment of the present invention, a third permutation operation improves the performance of the communication system 100 of FIG. 1 by rotating the N*rot data blocks across the N transmit streams. The following vector may be used as an indicator of the order of blocks to transmit.

$$m = \{(\text{rot}*q*(N-1)+p)\bmod(N*\text{rot}) p = N*(0:\text{rot}-1) + q 0 \leq q \leq N-1\}, \quad (3)$$

where the notation (0: rot−1) represents the sequence of indices 0, 1, 2, ... (rot−1).

For example, for the QPSK example illustrated above, a value of rot=48 may correspond to transmitting data blocks 0, 49, 2, 51, ..., 95 on transmit stream #0 418a, and data blocks 48, 1, 50, 3, ..., 47 on transmit stream #1 418b.

A representative embodiment of the present invention may use r=K/3 and rot=K, when 48 subcarriers are used (K=48) in transmitting via two transmit streams. A representative embodiment of the present invention using four transmit streams may employ values of r=K/2, and rot=K/2. When using three transmit streams, a representative embodiment of the present invention may use values of r=K/4 and rot=K. In a representative embodiment of the present invention, the value of r may be selected to be a large divisor of K, and the value of rot may be selected such that it is not equal in value to K/r.

In accordance with a representative embodiment of the present invention, an additional arrangement employing three transmit streams may also be employed, through the use of the following ordering:

$$m = \begin{cases} j & j = 0, 2, 4, \ldots 3*(rot-1)+1 \\ (rot*(N-1)+j)\bmod(N*rot) & j = 1, 5, 9, \ldots 3*(rot-1) \\ (rot*(N-2)+j)\bmod(N*rot) & j = 3, 7, 11, \ldots 3*(rot-1)+2 \end{cases} \quad (4)$$

Figure 5:
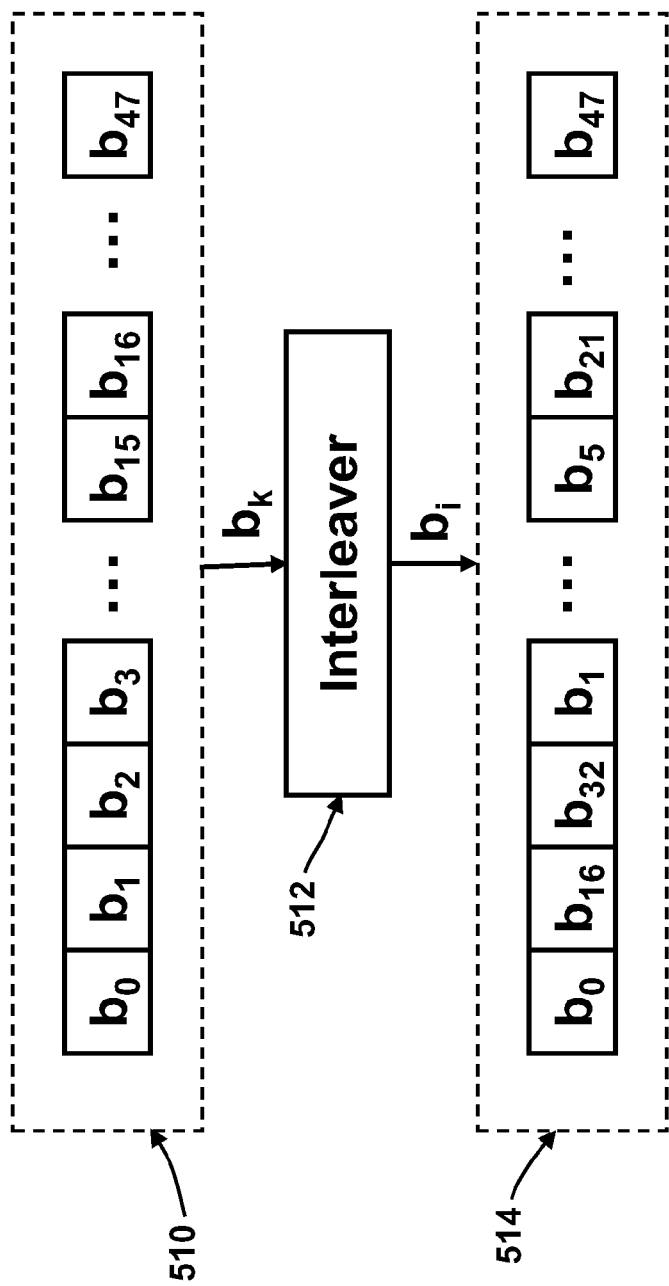
FIG. 5 illustrates the permutation of a block of input bits by an exemplary interleaver that produces a sequence of output bits, according to interleaving algorithms specified in the IEEE 802.11a and IEEE 802.11g standards.

FIG. 5 illustrates the permutation of a block of input bits 510 by an exemplary interleaver 512 that produces a sequence of output bits 514, according to interleaving algorithms specified in the IEEE 802.11a and IEEE 802.11g standards. The interleaver 512 may correspond, for example, to one of the interleavers 312, 314, 316 of FIG. 3A. As illustrated in FIG. 5, the interleaver 512 may operate according to the following formula:

$$i = 3(k \bmod 16) + \left\lfloor \frac{k}{16} \right\rfloor$$

$$k = 0, 1, \ldots 47$$

The interleaver 512 may function to map the $k^{th}$ bit of the block of input bits 510 to the $i^{th}$ bit of the sequence of output bits 514. Although the example interleaver 512 of FIG. 5 is illustrated as processing a block of input bits 510 that is 48 bits in length, in a representative embodiment of the present invention, such an interleaver may be employed to process larger blocks of input bits employing formula (1), shown above.

Figure 6:
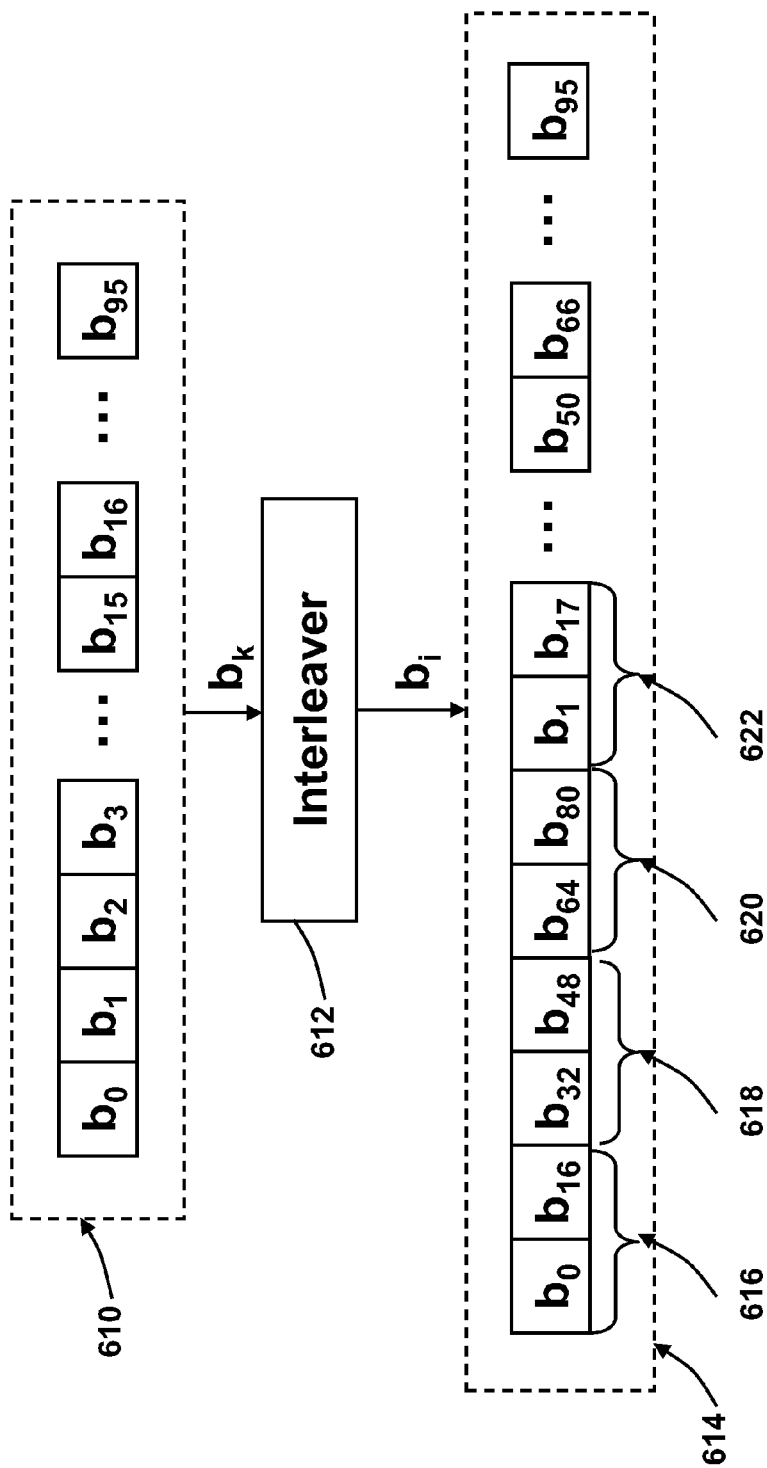
FIG. 6 illustrates the permutation of a block of input bits by another exemplary interleaver that produces a sequence of output bits, according to interleaving algorithms specified in the IEEE 802.11a and IEEE 802.11g standards.

FIG. 6 illustrates the permutation of a block of input bits 610 by another exemplary interleaver 612 that produces a sequence of output bits 614, according to interleaving algorithms specified in the IEEE 802.11a and IEEE 802.11g standards. The interleaver 612 may correspond, for example, to one of the interleavers 312, 314, 316 of FIG. 3A. As illustrated in FIG. 6, the interleaver 612 may operate according to the following formula:

$$i = 6(k \bmod 16) + \left\lfloor \frac{k}{16} \right\rfloor$$
$$k = 0, 1, \ldots, 95$$

As in the example of FIG. 5, the interleaver 612 functions to map the $k^{th}$ bit of the block of input bits 610 to the $i^{th}$ bit of the sequence of output bits 614. The example interleaver 612 of FIG. 6 illustrates the processing of a block of input bits 610 that is 96 bits in length, to produce a sequence of output bits 614. The sequence of output bits 614 is arranged into multiple sub-symbols such as sub-symbols 616, 618, 620, 622 according to the formula given above when the number of bits per sub-symbol, B, is equal to two, the number of subcarriers (also known as "tones") K is equal to 48, and the number of transmit streams N is equal to one. Although the interleaver shown in FIG. 6 is illustrated as processing a block of input bits 610 having 96 bits, a representative embodiment of the present invention may be employed to process blocks of input bits having a lesser or greater number of bits.

Figure 7:
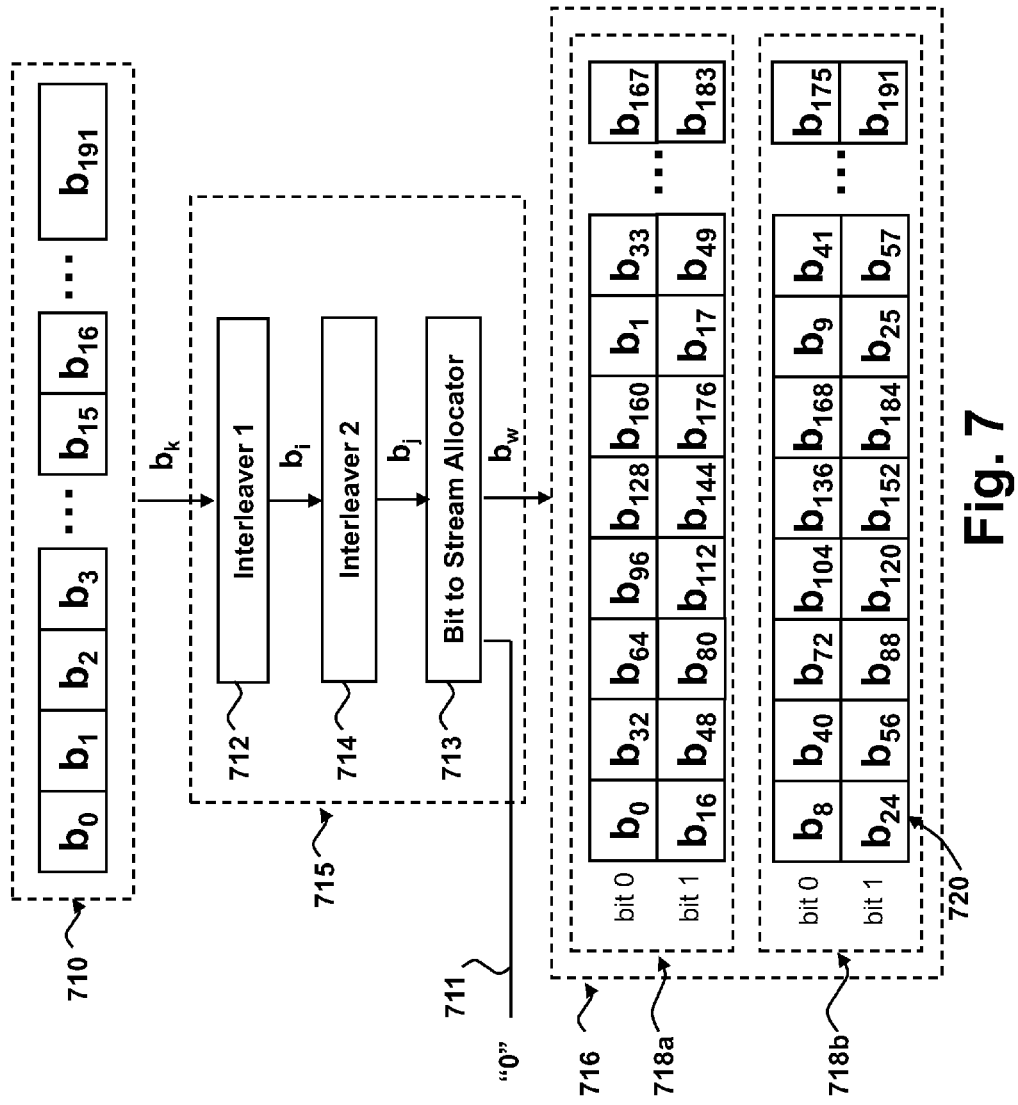
FIG. 7 illustrates the permutation of a block of input bits to a sequence of output bits by an exemplary interleaver block that may correspond, for example, to the interleaver block of FIG. 3, in accordance with a representative embodiment of the present invention.

FIG. 7 illustrates the permutation of a block of input bits 710 to a sequence of output bits by an exemplary interleaver block 715 that may correspond, for example, to the interleaver block 315 of FIG. 3, in accordance with a representative embodiment of the present invention. As shown in FIG. 7, the interleaver block 715 comprises an interleaver 712, an interleaver 714, and a bit-to-stream allocator 713. In a representative embodiment of the present invention, the interleaver 1 712 may function to map the $k^{th}$ bit of the block of input bits 710 to the $i^{th}$ bit of a bit sequence $b_i$ according to formula (1), shown above. In the example of FIG. 7, the parameter B is equal to two, K is equal to 48, N is equal to 2, and r is equal to 16. Other values of B, K, N, and r are possible within the spirit and scope of the present invention.

In a representative embodiment in accordance with the present invention, the interleaver 714 may function to map the $i^{th}$ bit of the sequence of bits $b_i$ from interleaver 712 to the $j^{th}$ bit of a bit sequence $b_j$, according to formula (2), shown above. In the example of FIG. 7, the parameter B is equal to two, K is equal to 48, N is equal to 2, r is equal to 16, and s is equal to one. Other values of B, K, N, r, and s may be employed without departing from the spirit and scope of the present invention.

In a representative embodiment in accordance with the present invention, the bit-to-stream allocator 713 may function in one of two modes according to the state of a control signal 711. In the illustration of FIG. 7 in which the control signal 711 is in a "0" state, the bit-to-stream allocator 713 may function to allocate bits from the bit sequence $b_j$ produced by interleaver 714 to first fill a subsequence of bits such as, for example, the subsequence 718a in its entirety, before allocating bits from the bit sequence $b_j$ to another subsequence of bits such as, for example, the subsequence 718b. Although the sequence of output bits 716 shown in FIG. 7 comprises two subsequences 718a, 718b, a greater or lesser number of subsequences may be employed without departing from the spirit and scope of the present invention.

The sequence of output bits 716 shown in FIG. 7 comprises two subsequences 718a, 718b that may correspond, for example, to two transmit streams such as the transmit streams #0 318a and #1 318b shown in FIG. 3. The subsequence 718a may correspond, for example, to the subsequence 320a of FIG. 3A, while the subsequence 718b may correspond to the subsequence 220b of FIG. 3A. Each of the subsequences 718a, 718b comprise pairs of bits from the block of input bits 710, such as the bits $b_0$, $b_{16}$ of subsequence 718a, and bits $b_8$, $b_{24}$ of subsequence 718b, located in column 720 of FIG. 7. These pairs of bits correspond, respectively, to one sub-symbol for one of the K subcarriers to be transmitted in via a transmit stream such as, for example, the OFDM signal #0 230a of FIG. 2. For example, bits $b_0$, $b_{16}$ may be allocated to the first subcarrier of a first OFDM transmit signal, and bits $b_8$, $b_{24}$ may be allocated to the first subcarrier of a second OFDM transmit signal. In the illustration of FIG. 7, the interleaver block 715 may function so as to allocate bits of a block of input bits first to all sub-symbols of a first subsequence of output bits, before allocating bits of the block of input bits to sub-symbols of a second subsequence of output bits.

A representative embodiment of the present invention as shown in FIG. 7 provides a separation of six subcarriers (i.e., tones) between bits in the sequence of output bits 716 for bits that are adjacent in the block of input bits 710. For example, bit $b_0$ is assigned to the sub-symbol for the first subcarrier in subsequence 718a, while bit $b_1$ is assigned to the sub-symbol for the fourth subcarrier in subsequence 718a. By assigning bits that are adjacent in the block of input bits 710 to different subcarriers of an OFDM transmit signal, a reduction in correlation between adjacent bits and greater immunity to transmission impairments is realized.

Figure 8:
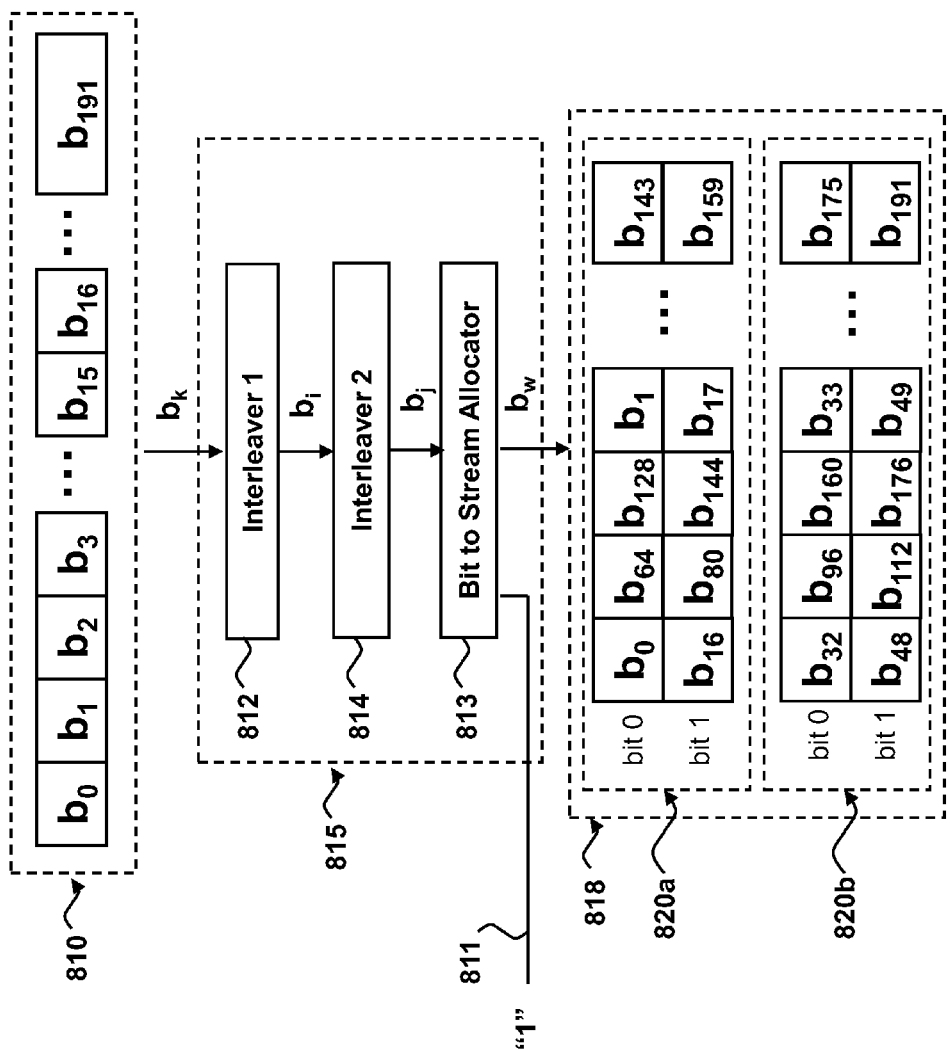
FIG. 8 illustrates the processing by an exemplary interleaver block of a block of input bits to produce a sequence of output bits comprising two subsequences of output bits for transmission via two OFDM transmit signals such as, for example, the OFDM signals #0 and #1 of FIG. 2, in accordance with another representative embodiment of the present invention.

FIG. 8 illustrates the processing by an exemplary interleaver block 815 of a block of input bits 810 to produce a sequence of output bits 818 comprising two subsequences of output bits 820a, 820b for transmission via two OFDM transmit signals such as, for example, the OFDM signals #0 230a and #1 230b of FIG. 2, in accordance with another representative embodiment of the present invention. The interleaver block 815 of FIG. 8 may correspond, for example, to the interleaver block 315 of FIG. 3. As shown in FIG. 8, the interleaver block 815 comprises an interleaver 812, an interleaver 814, and a bit-to-stream allocator 813. As described above with respect to FIG. 7, each pair of bits in a column of the subsequences 820a, 820b shown in FIG. 8 may represent a sub-symbol for transmission on the associated subcarrier (i.e., "tone") of an OFDM signal such as, for example, the OFDM signals #0 230a and #1 230b of FIG. 2.

In a representative embodiment of the present invention, interleaver 812 may function to map the $k^{th}$ bit of the block of input bits 810 to the $i^{th}$ bit of a sequence of bits $b_i$ according to formula (1), shown above. In the example of FIG. 8, the parameter B is equal to two, K is equal to 48, N is equal to 2, and r is equal to 16. Other values of B, K, N, and r are possible within the spirit and scope of the present invention.

In a representative embodiment in accordance with the present invention, interleaver 814 may function to map the $i^{th}$ bit of the sequence of bits $b_i$ produced by interleaver 812 to the $j^{th}$ bit of a bit sequence $b_p$ in accordance with formula (2), shown above. In the example of FIG. 8, the parameter B is equal to two, K is equal to 48, N is equal to 2, r is equal to 16, and s is equal to one. Other values of B, K, N, r, and s are possible within the spirit and scope of the present invention.

In a representative embodiment in accordance with the present invention, the bit-to-stream allocator 813 may correspond to, for example, the bit-to-stream allocator 713 of FIG. 7, and may function in the second of the two modes described above with respect to the bit-to-stream allocator 713 of FIG. 7. In the illustration of FIG. 8, the control signal 811 is in a "1" state, and the bit-to-stream allocator 813 may function to allocate bits from the bit sequence $b_j$ produced by interleaver 814 to first fill a selected subcarrier or "tone" in subsequences of bits such as, for example, the subsequences 820a, 820b for all of the transmit streams, before allocating bits from the bit sequence $b_j$ to the next subcarrier or "tone" of the subsequences of all transmit streams. Although the sequence of output bits 818 shown in FIG. 8 comprises two subsequences 820a, 820b, a greater or lesser number of subsequences may be employed without departing from the spirit and scope of the present invention.

A representative embodiment of the present invention as shown in FIG. 8 provides a separation of three subcarriers (i.e., tones) between bits in the sequence of output bits 818, for bits that are adjacent in the block of input bits 810. For example, bit $b_0$ is assigned to the sub-symbol for the first subcarrier in subsequence 820a, while bit $b_1$ is assigned to the sub-symbol for the fourth subcarrier in subsequence 820a. By assigning bits that are adjacent in the block of input bits 810 to different subcarriers of an OFDM transmit signal, a reduction in correlation between adjacent bits and greater immunity to transmission impairments is realized.

Figure 9:
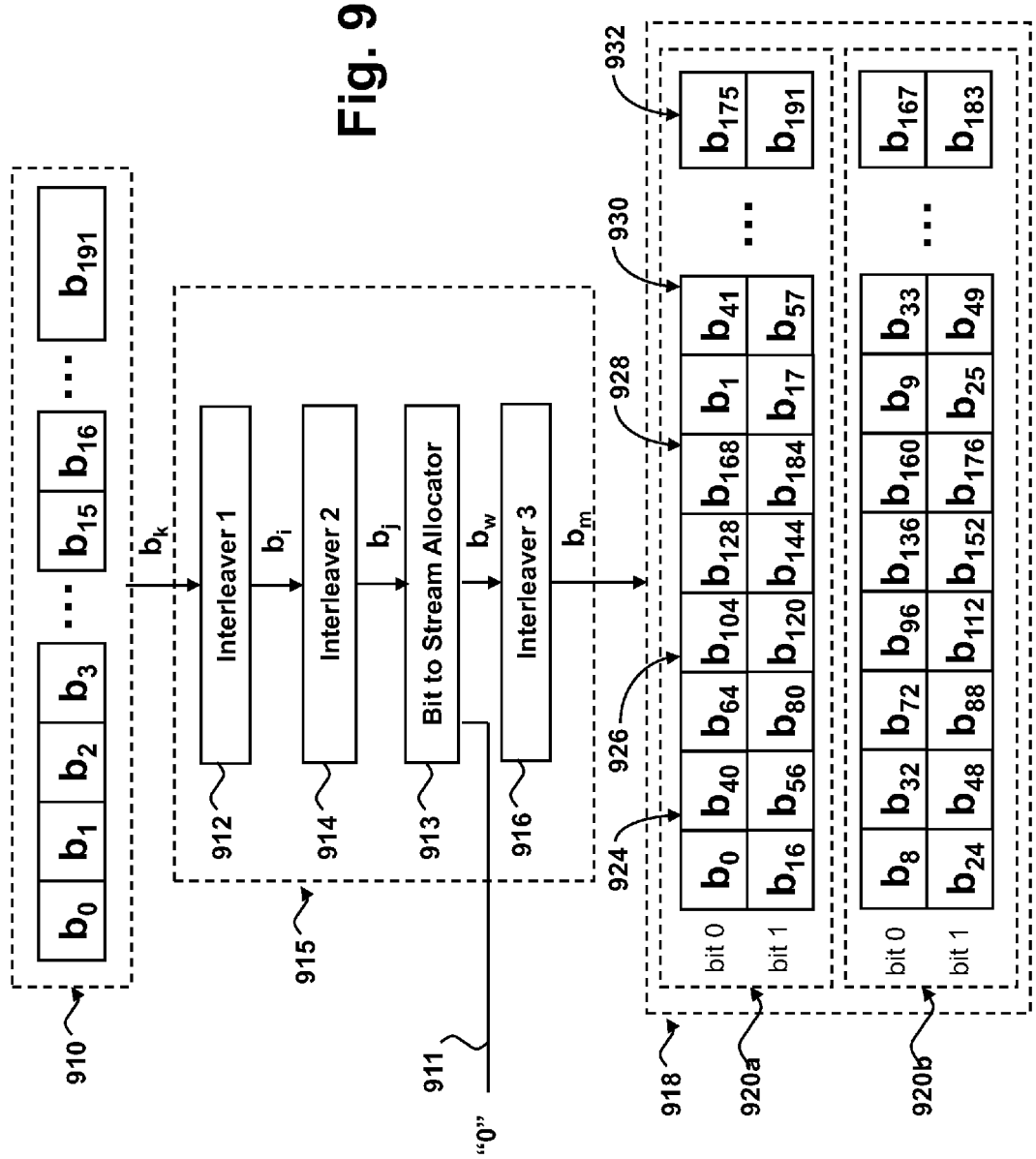
FIG. 9 illustrates the processing by an exemplary interleaver block of a block of input bits to produce a sequence of output bits comprising two subsequences of output bits for transmission via two OFDM transmit signals such as, for example, the OFDM signals #0 and #1 of FIG. 2, in accordance with another representative embodiment of the present invention.

FIG. 9 illustrates the processing by an exemplary interleaver block 915 of a block of input bits 910 to produce a sequence of output bits 918 comprising two subsequences of output bits 920a, 920b for transmission via two OFDM transmit signals such as, for example, the OFDM signals #0 230a and #1 230b of FIG. 2, in accordance with another representative embodiment of the present invention. The interleaver block 915 of FIG. 9 may correspond, for example, to the interleaver block 315 of FIG. 3. As shown in FIG. 9, the interleaver block 915 comprises an interleaver 912, an interleaver 914, a bit-to-stream allocator 913, and an interleaver 916. The interleaver block 915 receives a block of input bits 910 and produces a sequence of output bits 918 comprising a first subsequence 920a, and a second subsequence 920b. The first and second subsequences 920a, 920b may correspond, for example, to the subsequences of bits 320a, 320b shown in FIG. 3A. As described above with respect to FIG. 7, each pair of bits in a column of the subsequences 920a, 920b shown in FIG. 9 may represent a sub-symbol for transmission on the associated subcarrier (i.e., "tone") of an OFDM signal such as, for example, the OFDM signals #0 230a and #1 230b of FIG. 2.

In a representative embodiment of the present invention, interleaver 912 of the interleaver block 915 may function to map the $k^{th}$ bit of the block of input bits 910 to the $i^{th}$ bit of a sequence of bits $b_i$, according to formula (1), shown above. In the example of FIG. 9, the parameter B is equal to two, K is equal to 48, N is equal to 2, and r is equal to 16. Other values of B, K, N, and r are possible within the spirit and scope of the present invention.

In a representative embodiment in accordance with the present invention, interleaver 914 may function to map the $i^{th}$ bit of the sequence of bits $b_i$ from interleaver 912 to the $j^{th}$ bit of a bit sequence $b_j$, in accordance with formula (2), shown above. In the example of FIG. 9, the parameter B is equal to two, K is equal to 48, N is equal to 2, r is equal to 16, and s is equal to one. Other values of B, K, N, r, and s are possible within the spirit and scope of the present invention.

In a representative embodiment in accordance with the present invention, the bit-to-stream allocator 913 may function in one of two modes according to the state of a control signal 911. In the illustration of FIG. 9 in which the control signal 911 is in a "0" state, the bit-to-stream allocator 913 may function to allocate bits from the bit sequence $b_j$ produced by interleaver 914 to first fill a subsequence of bits for a first transmit stream in its entirety, before allocating bits from the bit sequence $b_j$ to fill another subsequence of bits for another transmit stream.

In a representative embodiment of the present invention, interleaver 916 may correspond to, for example, the interleaver 317 of FIG. 3, and may function to swap or rotate sub-symbols such as, for example, the sub-symbols 922, 924, 926, 928, 930 between a first subsequence for a first transmit stream such as, for example, subsequence 920a, and a second subsequence for a second transmit stream such as, for example, subsequence 920b. For example, in the illustration of FIG. 9 interleaver 912 and interleaver 914 may operate to produce a sequence of bits that corresponds to the sequence of output bits 716 shown in FIG. 7. The function of interleaver 916 of FIG. 9 may swap or rotate a sub-symbol such as, for example, the sub-symbol comprising bits $b_{32}$, $b_{48}$ of the subsequence 718a of FIG. 7, and the sub-symbol comprising bits $b_{40}$, $b_{56}$ of the subsequence 718b of FIG. 7. This may produce the arrangement of bits shown in the sub-symbols in column 922 of the subsequences 920a, 920b of FIG. 9. In a similar fashion, interleaver 916 may also swap sub-symbols 924, 926, 928, 930 between subsequences 920a and 920b. Although the illustration of FIG. 9 shows rotation or swapping of only five sub-symbols between two subsequences of bits, a greater number of sub-symbols and/or subsequences may be employed without departing from the spirit or scope of the present invention.

A representative embodiment of the present invention as shown in FIG. 9 provides a separation of six subcarriers (i.e., tones) between bits in the sequence of output bits 918 for bits that are adjacent in the block of input bits 910. For example, bit $b_0$ is assigned to the first subcarrier in the subsequence 920a, while bit $b_1$ is assigned to the fourth subcarrier in the subsequence 920a. By assigning bits that are adjacent in the block of input bits 910 to different subcarriers of an OFDM transmit signal, a reduction in correlation of bits and greater immunity to impairments is realized.

Figure 10:
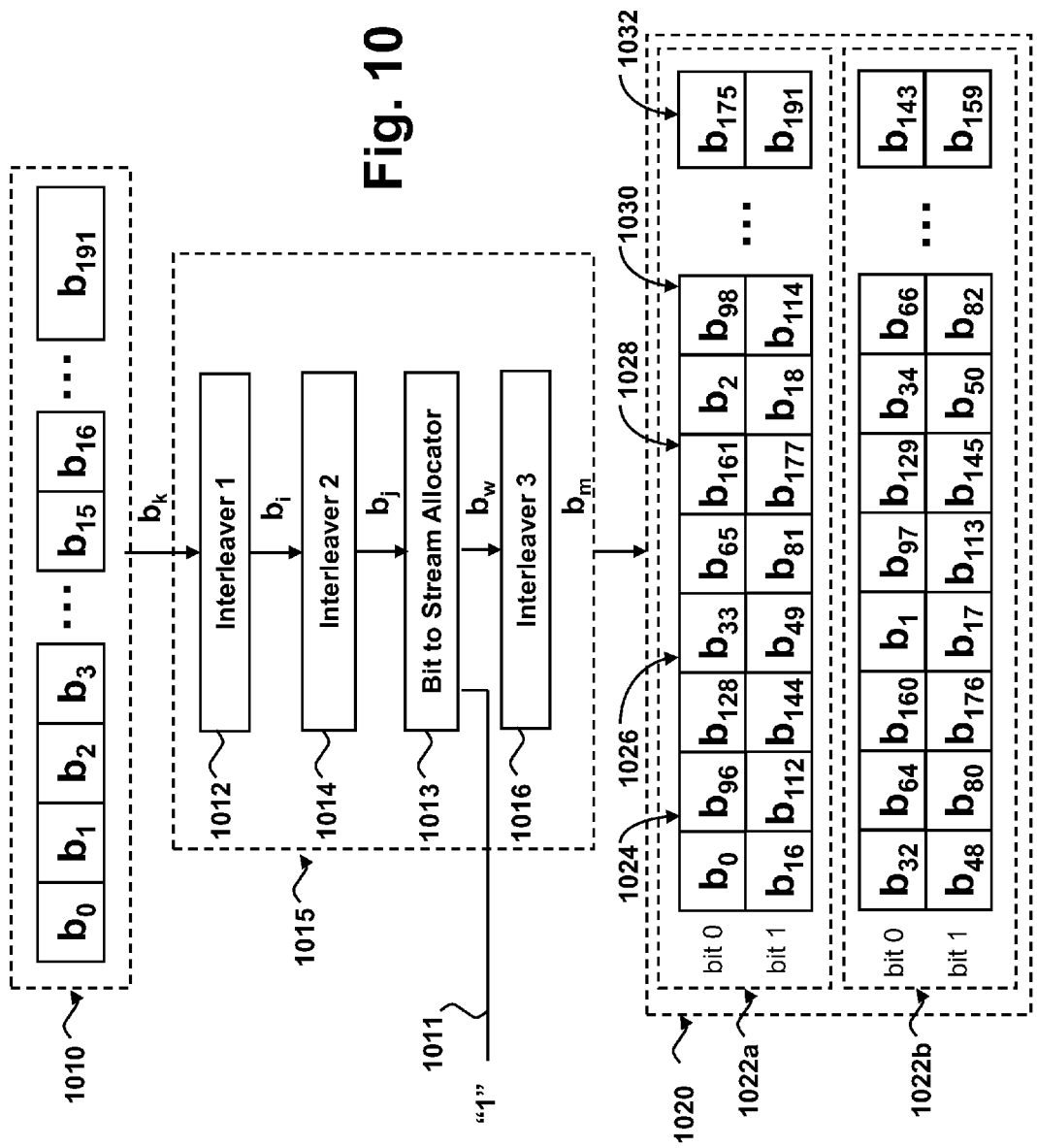
FIG. 10 illustrates the processing by an exemplary interleaver block of a block of input bits to produce a sequence of output bits comprising two subsequences of output bits for transmission via, for example, two OFDM transmit signals such as the OFDM signals #0 and #1 of FIG. 2, in accordance with another representative embodiment of the present invention.

FIG. 10 illustrates the processing by an exemplary interleaver block 1015 of a block of input bits 1010 to produce a sequence of output bits 1020 comprising two subsequences of output bits 1022a, 1022b for transmission via, for example, two OFDM transmit signals such as the OFDM signals #0 230a and #1 230b of FIG. 2, in accordance with another representative embodiment of the present invention. The interleaver block 1015 of FIG. 10 may correspond, for example, to the interleaver block 315 of FIG. 3. As shown in FIG. 10, the interleaver block 1015 comprises an interleaver 1012, a bit-to-stream allocator 1013, and an interleaver 1018. The interleaver block 1015 receives a block of input bits 1010 and produces a sequence of output bits 1020 comprising a first subsequence 1022a, and a second subsequence 1022b. The first and second subsequences 1022a, 1022b may correspond, for example, to subsequences of bits 320a, 320b shown in FIG. 3A. As described above with respect to FIG. 7, each pair of bits in a column of the subsequences 1022a, 1022b shown in FIG. 10 may represent a sub-symbol for transmission on the associated subcarrier (i.e., tone) of an OFDM signal such as, for example, the OFDM signals #0 230a and #1 230b of FIG. 2.

In a representative embodiment of the present invention, interleaver 1012 of the interleaver block 1015 may function to map the $k^{th}$ bit of the block of input bits 1010 to the $i^{th}$ bit of a sequence of bits $b_i$, according to formula (1), shown above. In the example of FIG. 10, the parameter B is equal to two, K is equal to 48, N is equal to 2, and r is equal to 16. Other values of B, K, N, and r are possible within the spirit and scope of the present invention.

In a representative embodiment of the present invention, the interleaver 1014 may function to allocate bits of the sequence $b_i$ produced by interleaver 1012 first to sub-symbols of the same subcarrier of each of the OFDM transmit signals, before then allocating bits of the sequence $b_i$ to sub-symbols of the next subcarrier of each OFDM transmit signal. The allocating process continues until all bits of the sequence of bits $b_i$ have been allocated to sub-symbols for all subcarriers of all OFDM transmit signals.

In a representative embodiment in accordance with the present invention, interleaver 1014 may function to map the $i^{th}$ bit of the sequence of bits $b_i$ from interleaver 1012 to the $j^{th}$ bit of a bit sequence $b_p$ in accordance with formula (2), shown above. In the example of FIG. 10, the parameter B is equal to two, K is equal to 48, N is equal to 2, r is equal to 16, and s is equal to one. Other values of B, K, N, r, and s are possible within the spirit and scope of the present invention.

In a representative embodiment in accordance with the present invention, the bit-to-stream allocator 1013 may correspond to, for example, the bit-to-stream allocator 913 of FIG. 9, and may function in the second of the two modes described above with respect to the bit-to-stream allocator 913. In the illustration of FIG. 10, the control signal 1011 is in a "1" state, and the bit-to-stream allocator 1013 may function to allocate bits from the bit sequence $b_j$ produced by interleaver 1014 to produce a bit sequence $b_w$ in which bits are allocated to a selected subcarrier or "tone" for all transmit streams, before allocating bits from the bit sequence $b_j$ to the next subcarrier or "tone" of all transmit streams.

In a representative embodiment in accordance with the present invention, interleaver 3 1016 may function to map the $w^{th}$ bit of the sequence of bits $b_w$ produced by the bit-to-stream allocator 1013, to the $m^{th}$ bit of a bit sequence $b_m$ that is shown in FIG. 10 as sequence of output bits 1020. The sequence of output bits 1020 shown in FIG. 10 comprises subsequences 1022a, 1022b for transmission via two OFDM signals such as, for example, the OFDM signals #0 230a and #1 230b of FIG. 2.

In a representative embodiment of the present invention, the interleaver 1016 may function to swap or rotate sub-symbols such as, for example, the sub-symbols in columns 1024, 1026, 1028, 1030, 1032 of FIG. 10 between a first subsequence for a first transmit stream such as, for example, the subsequence 1022a, and a second subsequence for a second transmit stream such as, for example, subsequence 1022b. For example, in the illustration of FIG. 10 interleaver 1012, interleaver 1014, and the bit-to-stream allocator 1013 may operate to produce a sequence of bits that corresponds to the sequence of output bits 818 shown in FIG. 8. The function of interleaver 1016 may be to swap a sub-symbol comprising, for example, the bits $b_{64}$, $b_{80}$ of subsequence 820a, and the sub-symbol comprising bits $b_{96}$, $b_{112}$ of subsequence 820b, to produce the arrangement of bits shown in the sub-symbols of column 1024 of subsequences 1022a, 1022b. In a similar fashion, interleaver 1016 may also swap sub-symbols in columns 1026, 1028, 1030, and 1032 between subsequences 1022a and 1022b. Although the illustration of FIG. 10 shows the swapping or rotation of only five pairs of sub-symbols, a greater number of corresponding sub-symbols and/or a greater number of subsequences may be employed without departing from the spirit or scope of the present invention.

The use of a representative embodiment of the present invention as shown in FIG. 10 results a separation of three subcarriers (i.e., tones) between bits in the sequence of output bits 1020, for bits that are adjacent in the block of input bits 1010. In addition, the interleaver block 1015 of FIG. 10 provides additional de-correlation by assigning adjacent bits in the block of input bits 1010 to sub-symbols in a different subsequence of output bits. For example, in the illustration of FIG. 10, bit $b_0$ is assigned to the sub-symbol for the first subcarrier in the subsequence 1022a, while bit $b_1$ is assigned to the sub-symbol for the fourth subcarrier in subsequence 1022b. By assigning adjacent bits in the block of input bits 1010 to sub-symbols in different output subsequences 1022a, 1022b and, therefore for transmission on different OFDM transmit signals, an additional reduction in correlation between bits and greater immunity to transmission impairments is realized over subcarrier separation on a single OFDM transmit signal.

Figure 11:
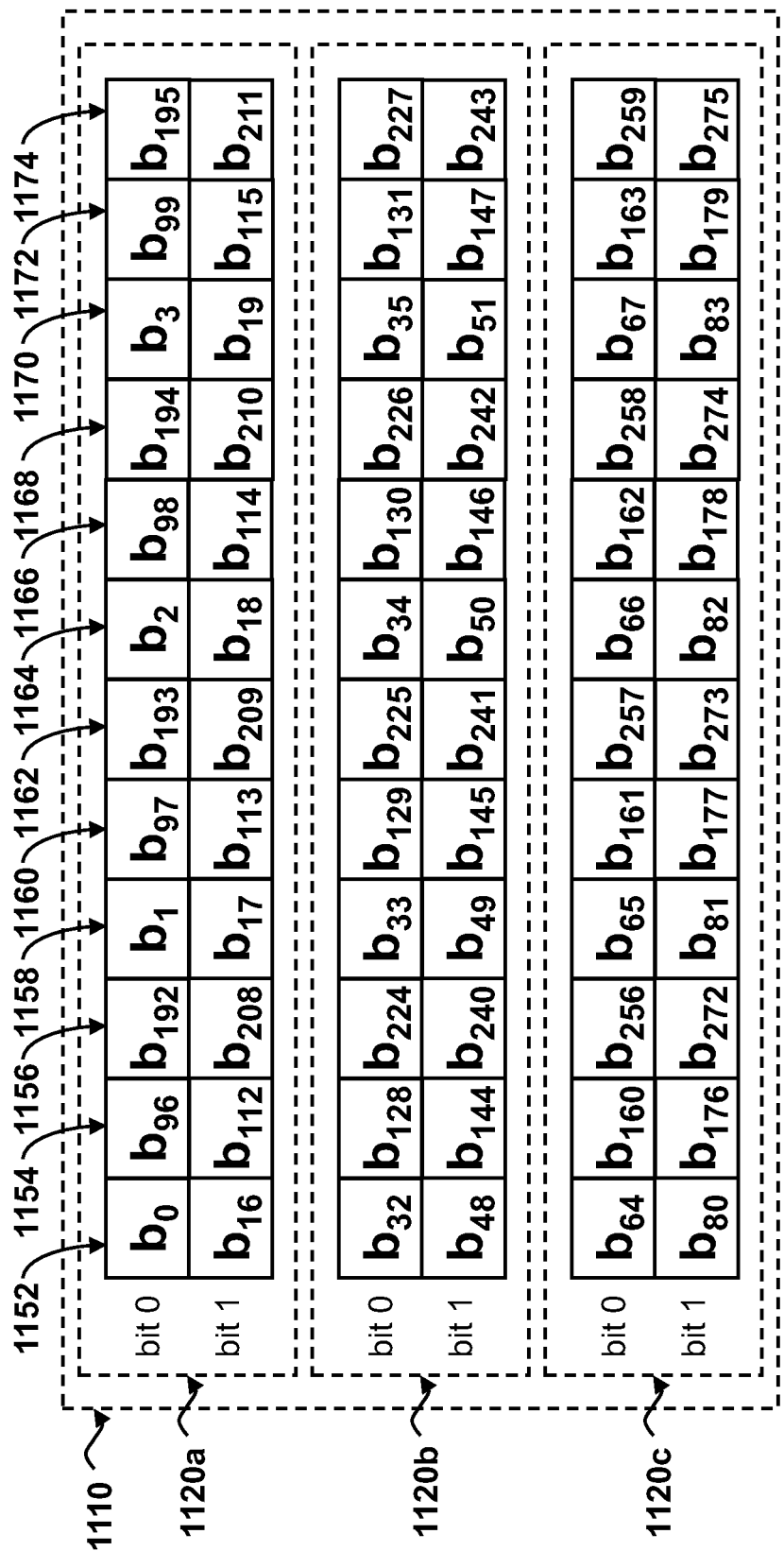
FIG. 11 illustrates an exemplary sequence of output bits comprising three subsequences of output bits for transmission via, for example, three OFDM transmit signals, the sequence of output bits produced by an interleaver block such as, for example, the interleaver block of FIG. 8, in accordance with another representative embodiment of the present invention.

FIG. 11 illustrates an exemplary sequence of output bits 1110 comprising three subsequences of output bits 1120a, 1120b, 1120c for transmission via, for example, three OFDM transmit signals, the sequence of output bits 1110 produced by an interleaver block such as, for example, the interleaver block 815 of FIG. 8, in accordance with another representative embodiment of the present invention. The illustration of FIG. 11 shows a portion of a block of 288 input bits (288=B*K*N, where B=2, K=48, N=3) following processing by an interleaver block such as, for example, the interleaver block 815 of FIG. 8. In the illustration of FIG. 8, the interleaver block 815 produces a sequence of output bits 818 comprising two subsequences 820a, 820b for transmission via two OFDM signals such as, for example, the OFDM signals #0 230a and #1 230b of FIG. 2. In a similar fashion, a representative embodiment of the present invention may be employed to produce a sequence of output bits 1110 comprising three subsequences 1120a, 1120b, 1120c, as illustrated in FIG. 11, for transmission via three OFDM transmit signals. In the representative embodiment illustrated in FIG. 11, the bits from a block of input bits (not shown) are allocated to sub-symbols in one of three subsequences 1120a, 1120b, 1120c that may correspond, for example, to one of three transmit streams similar to the transmit streams 318a, 318b shown in FIG. 3.

An interleaver block in accordance with the present invention may allocate bits from a block of input bits to sub-symbols of a sequence of output bits by first allocating bits to a sub-symbol of a designated subcarrier in all subsequences, before allocating bits to sub-symbols for transmission via the next subcarrier, and so on. For example, the bits allocated to sub-symbols 616, 618, 620 in the sequence of output bits 614 from the interleaver 612 of FIG. 6 may be allocated to the three subsequences 1120a, 1120b, 1120c in a round-robin fashion as shown in column 1152 of FIG. 11, for transmission using the first subcarrier of each of three OFDM signals. The next three sub-symbols of the sequence of output bits 614 may then be allocated to the next subcarrier (i.e., column 1154 of FIG. 11) of three OFDM transmit signals, similar to the two OFDM signals 230a, 230b of FIG. 2, for example. Succeeding sub-symbols may be allocated in a similar fashion to the columns 1156 as shown by columns 1156, 1158, 1160, 1162, 1164, 1166, 1168, 1170, 1172, and 1174. In a representative embodiment of the present invention, an interleaver block similar to, for example, the interleaver block 815 of FIG. 8 may be employed to process a block of input bits such as, for example, the block of input bits 810, for transmission via three OFDM signals. Only 12 sub-symbols for 12 subcarriers of each of three OFDM signals are shown in FIG. 11, although in a communication system such as the communication system 100 of FIG. 1 employing 48 subcarriers, an additional 36 subcarriers may be used. The sub-symbols for the additional subcarriers have been omitted from FIG. 11 for reasons of clarity.

Figure 12:
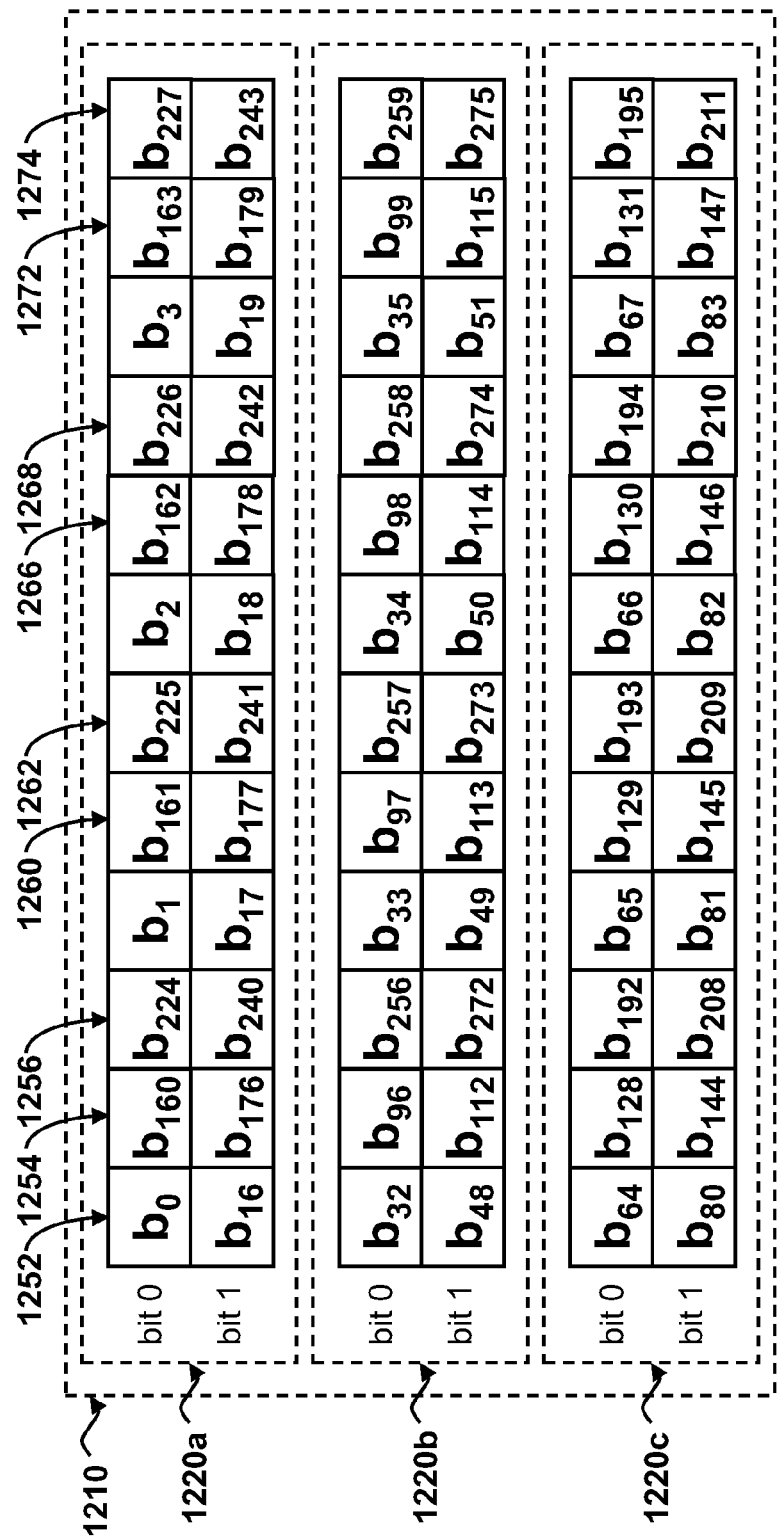
FIG. 12 illustrates an exemplary sequence of output bits comprising three subsequences of output bits for transmission via, for example, three OFDM transmit signals, where the sequence of output bits are produced by an interleaver block such as, for example, the interleaver block of FIG. 10, in accordance with another representative embodiment of the present invention.

FIG. 12 illustrates an exemplary sequence of output bits 1210 comprising three subsequences of output bits 1220a, 1220b, 1220c for transmission via, for example, three OFDM transmit signals, where the sequence of output bits 1210 are produced by an interleaver block such as, for example, the interleaver block 1015 of FIG. 10, in accordance with another representative embodiment of the present invention. The illustration of FIG. 12 shows only a portion of a block of 288 input bits (288=B*K*N, where B=2, K=48, N=3) following processing by an interleaver block such as, for example, the interleaver block 1015 of FIG. 10. Although FIG. 10 illustrates an interleaver block 1015 that produces a sequence of output bits 1020 comprising two subsequences 1022a, 1022b for transmission via two OFDM signals, the present invention is not limited to the particular embodiment of FIG. 10, and may be applied to produce a greater number of subsequences of output bits. The sequence of output bits 1210 is similar to the sequence of output bits 1110 of FIG. 11, with the additional operation of swapping or rotating selected columns of sub-symbols between the subsequences 1220a, 1220b, 1220c. In the representative embodiment illustrated in FIG. 12, the bits from a block of input bits (not shown) are allocated to sub-symbols in one of three subsequences 1220a, 1220b, 1220c that may correspond, for example, to one of three transmit streams similar to the transmit streams 318a, 318b shown in FIG. 3.

In the illustration of FIG. 12, it can be seen that sub-symbols in columns 1254, 1256, 1260, 1262, 1266, 1268, 1272, and 1274 have been rotated between the subsequences 1220a, 1220b, 1220c when compared to the arrangements shown in columns 1154, 1156, 1160, 1162, 1166, 1168, 1172, and 1174, respectively, of FIG. 11. For example, in FIG. 11 the bits $b_{96}$, $b_{112}$ from the block of input bits have been allocated to a sub-symbol for the second subcarrier (column 1154) of the subsequence 1120a, whereas in the illustration of FIG. 12, the same bits $b_{96}$, $b_{112}$ from the block of input bits are allocated to a sub-symbol for the second subcarrier (column 1254) of the subsequence 1220b. In a similar fashion, in FIG. 11 the bits $b_{128}$, $b_{144}$ that are allocated to the sub-symbol for the second carrier (column 1154) of subsequence 1120b are allocated in the example of FIG. 12 to the second subcarrier (column 1254) of subsequence 1220c. To complete the example, the bits $b_{160}$, $b_{176}$ that are allocated to the second subcarrier (column 1154) of subsequence 1120c in FIG. 11 are instead allocated in the illustration of FIG. 12 to the second carrier (column 1254) of subsequence 1220a. Similar rotations of sub-symbols between the subsequences 1220a, 1220b, 1220c are performed between sub-symbols in columns 1160, 1166, and 1172 of FIG. 11 and columns 1260, 1266, and 1272 of FIG. 12. As shown in FIG. 12, an interleaver block in accordance with a representative embodiment of the present invention may perform a similar rotation of sub-symbols, where the sub-symbols in columns 1156, 1162, 1168, and 1174 of FIG. 11 are rotated from subsequence 1120a to subsequence 1220c, from subsequence 1120b to subsequence 1220a, and from subsequence 1120c to subsequence 1220b to form columns 1256, 1262, 1268, and 1274 of FIG. 12, respectively. Only 12 sub-symbols for 12 subcarriers of each of three OFDM signals are shown in FIG. 12, although in a communication system such as the communication system 100 of FIG. 1 employing 48 subcarriers, an additional 36 subcarriers may be used. The sub-symbols for the additional subcarriers have been omitted from FIG. 12 for reasons of clarity.

The use of a representative embodiment of the present invention as shown in FIG. 12 results a separation of three subcarriers (i.e., tones) between bits in the sequence of output bits 1210, for bits that are adjacent in the block of input bits (not shown).

Figure 13:
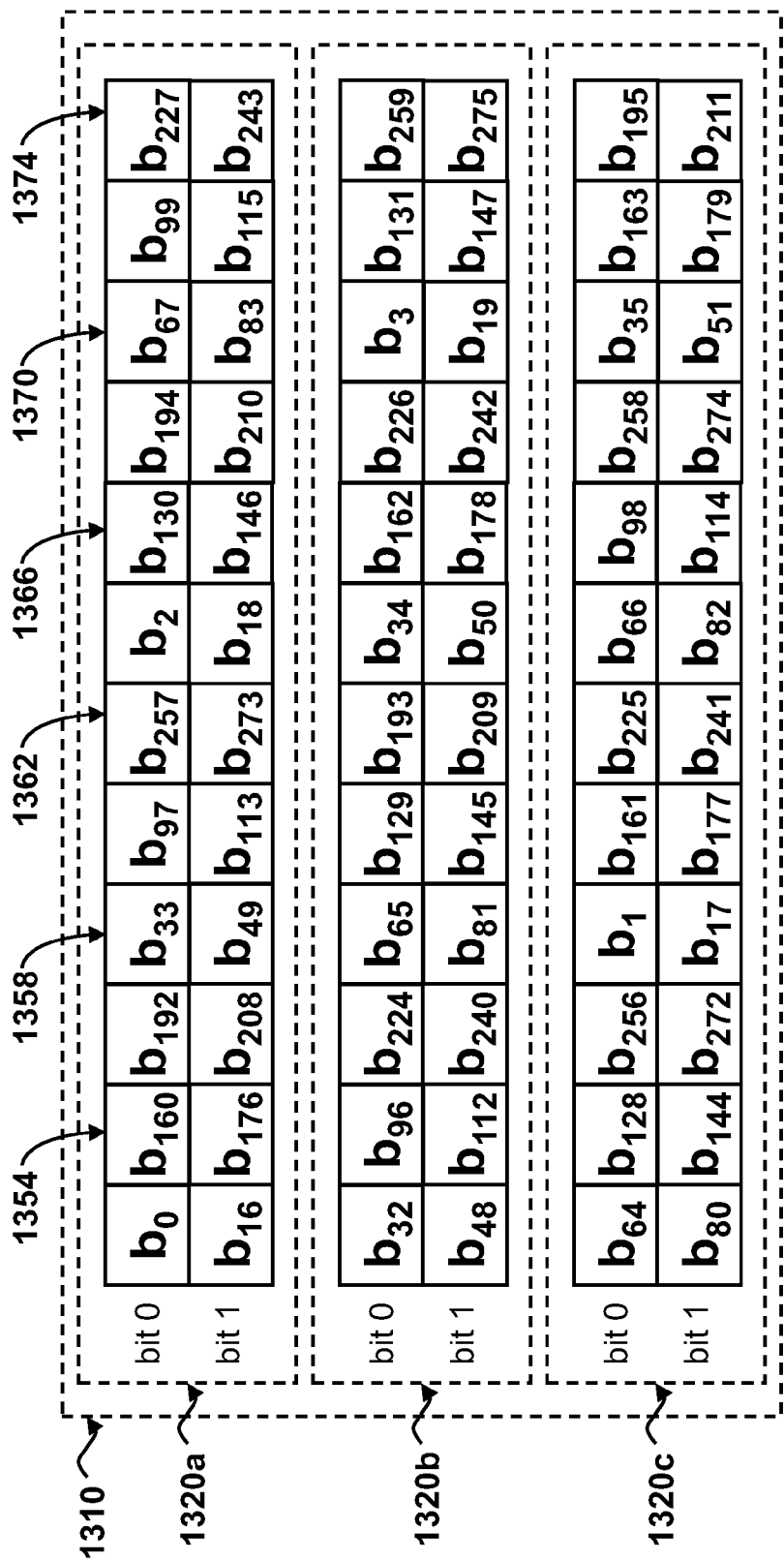
FIG. 13 illustrates another exemplary sequence of output bits comprising three subsequences of output bits for transmission via, for example, three OFDM transmit signals, where the sequence of output bits are produced by an interleaver block such as, for example, the interleaver block of FIG. 8, in accordance with a representative embodiment of the present invention.

FIG. 13 illustrates another exemplary sequence of output bits 1310 comprising three subsequences of output bits 1320a, 1320b, 1320c for transmission via, for example, three OFDM transmit signals, where the sequence of output bits 1310 are produced by an interleaver block such as, for example, the interleaver block 815 of FIG. 8, in accordance with a representative embodiment of the present invention. In the representative embodiment illustrated in FIG. 13, bits from a block of input bits (not shown) are allocated to sub-symbols in one of three subsequences 1320a, 1320b, 1320c that may correspond to, for example, one of three transmit streams similar to the transmit streams 318a, 318b shown in FIG. 3. The illustration of FIG. 13 shows only a portion of a block of 288 input bits (288=B*K*N, where B=2, K=48, N=3) following processing by an interleaver block such as, for example, the interleaver block 1015 of FIG. 10. Although the illustration of FIG. 10 shows an interleaver block 1015 that produces a sequence of output bits 1020 comprising two subsequences 1022a, 1022b for transmission via two OFDM signals, the present invention is not limited to the particular embodiment of FIG. 10, and may be applied to produce a greater number of transmit streams comprising subsequences of output bits. The sequence of output bits 1310 is similar to the sequence of output bits 1110 of FIG. 11, with the additional operation of swapping or rotating sub-symbols between the subsequences 1320a, 1320b, 1320c in a manner different from that illustrated in FIG. 12.

In the illustration of FIG. 13, it can be seen that sub-symbols in columns 1354, 1358, 1362, 1366, 1370, and 1374 have been rotated between the subsequences 1320a, 1320b, 1320c compared to the arrangement of sub-symbols shown in columns 1154, 1158, 1162, 1166, 1170, and 1174 of FIG. 11, respectively. In the illustration of FIG. 13, the sub-symbols assigned to every other subcarrier have been rotate across the subsequences 1320a, 1320b, 1320c and, therefore, across the OFDM transmit streams that carry them. For example, in FIG. 11 the bits $b_{96}$, $b_{112}$ from the block of input bits have been allocated to a sub-symbol for the second subcarrier (column 1154) of the subsequence 1120a, whereas in the illustration of FIG. 13, the same bits $b_{96}$, $b_{112}$ from the block of input bits are allocated to a sub-symbol for the second subcarrier (column 1354) of the subsequence 1320b. In a similar fashion, in FIG. 11 the bits $b_{128}$, $b_{144}$ that are allocated to the sub-symbol for the second subcarrier (column 1154) of subsequence 1120b are allocated in the example of FIG. 13 to the second subcarrier (column 1354) of subsequence 1320c. To complete the example, the bits $b_{160}$, $b_{176}$ that are allocated to the second subcarrier (column 1154) of subsequence 1120c in FIG. 11 are instead allocated in the illustration of FIG. 13 to the second subcarrier (column 1354) of subsequence 1320a. Similar rotations of sub-symbols between the subsequences 1320a, 1320b, 1320c are performed in columns 1362, and 1370 of FIG. 13. As illustrated in FIG. 13, an interleaver block in accordance with a representative embodiment of the present invention may also perform a rotation of sub-symbols in columns 1358, 1366, and 1374, where the sub-symbols are rotated from subsequence 1120a to subsequence 1320c, from subsequence 1120b to subsequence 1320a, and from subsequence 1120c to subsequence 1320b. Although only 12 sub-symbols for 12 subcarriers of each of three OFDM signals are shown in FIG. 13, in a communication system such as the communication system 100 of FIG. 1 employing 48 subcarriers (i.e., tones), an additional 36 subcarriers may be used. The sub-symbols for the additional subcarriers have been omitted from FIG. 13 for reasons of clarity.

The use of a representative embodiment of the present invention as illustrated in FIG. 13 results in a separation of three subcarriers (i.e., tones) between bits in the sequence of output bits 1310, for bits that are adjacent in the block of input bits (not shown). However, additional de-correlation of errors in transmitted bits is provided by the allocation of adjacent bits in the block of input bits to different subsequences 1320a, 1320b, 1320c in the sequence of output bits 1310.

The illustration of FIG. 12 uses the mapping (3) discussed above with respect to FIG. 4, with rot=K, and applies it to the subsequences shown in FIG. 11, which are input into the "bit-to-stream allocator". It may be seen from the illustration of FIG. 12 that adjacent bit separation is not improved. A representative embodiment of the present invention may employ a mapping such as the mapping (4) discussed above, in a system using three transmit streams. The results of employing such a mapping are illustrated in FIG. 13. From the illustration of FIG. 3 it is clear that a representative embodiment of the present invention has accomplished the desired separation in the subsequences 1320a, 1320b, 1320c of adjacent bits of the input symbol.

Figure 14:
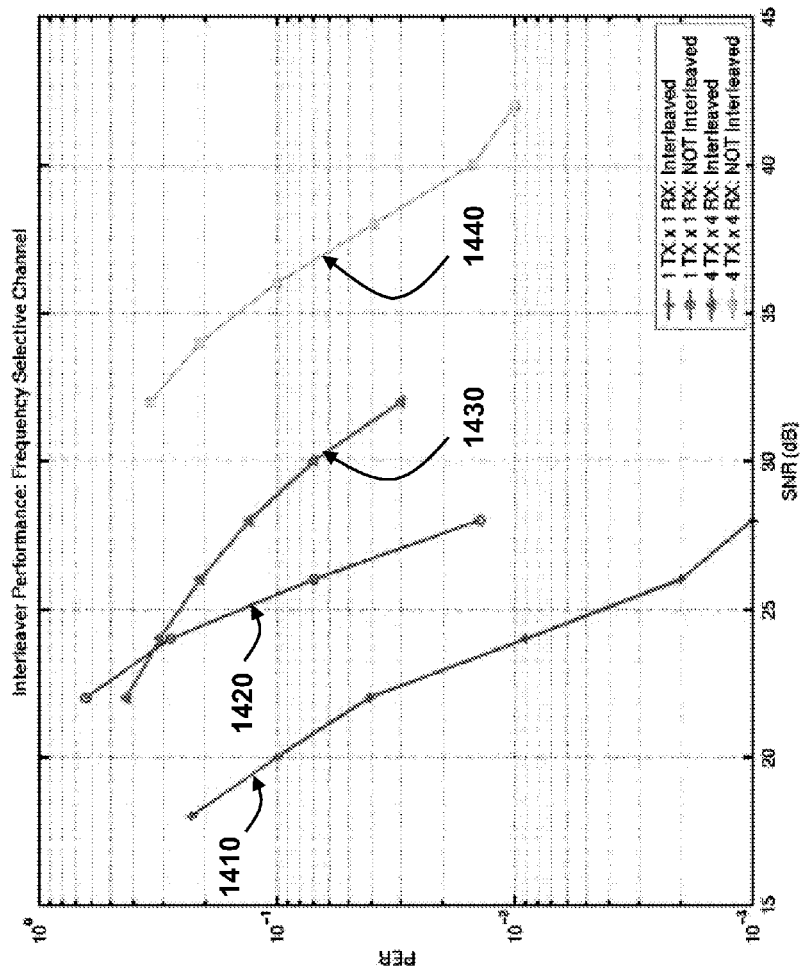
FIG. 14 is a graph comparing the estimated performance of communication systems employing existing (i.e., legacy, IEEE 802.11a/g) interleaving techniques and one transmit and one receive antenna, no bit interleaving using one transmit and one receive antenna, a system employing four transmit and four receive antennas without interleaving, and a system employing four transmit and four receive antennas with interleaving in accordance with a representative embodiment of the present invention.

FIG. 14 is a graph comparing the estimated performance of communication systems employing existing (i.e., legacy, IEEE 802.11a/g) interleaving techniques and one transmit and one receive antenna (1410), no bit interleaving using one transmit and one receive antenna (1420), a system employing four transmit and four receive antennas without interleaving (1440), and a system employing four transmit and four receive antennas with (1430) interleaving in accordance with a representative embodiment of the present invention. The results shown in FIG. 14 for systems employing multiple input multiple output (MIMO) configurations (i.e., curves 1430, 1440) represent the performance of a uniform linear array of antennas, spaced at half-wavelength intervals, assuming a 20 MHz signal bandwidth compliant with the IEEE 802.11n channel model D transmitted over a distance of 15 meters, and 64-point quadrature amplitude modulation (QAM) using a code with rate R=½. The receiver was assumed to employ soft Viterbi decoding, and to exchange packets of 1000 bytes in length.

The illustration of FIG. 14 shows that a single receive/single transmit antenna communication system transmitting over a 50 nanosecond delay spread channel using legacy interleaving (curve 1410) is estimated to require a signal to noise ratio (SNR) of 20 dB to achieve a packet error rate of 0.1 (10%). In comparison, a similar communication system without interleaving (curve 1420) is estimated to require over 25 dB to achieve the same packet error rate. The performance of a communication system employing four transmit and four receive antennas (curve 1430) and interleaving in accordance with a representative embodiment of the present invention is expected to achieve a packet error rate of 0.1 (10%) at a SNR of 28 dB, however such a system has a higher effective bit rate due to the simultaneous use of multiple transmit streams. In contrast, a similar communication system employing four transmit and four receive antennas without the interleaving of the present invention (curve 1440) is expected to achieve a packet error rate of 0.1 (10%) only at a SNR of more than 36 dB. Such results indicate that employment of a representative embodiment of the present invention in wireless OFDM communication systems similar to IEEE 802.11a/g may be expected to provide a significant improvement in packet error rate.

As systems are evolving towards multiple antennas, another dimension can be exploited: space. A representative embodiment in accordance with the present invention keeps the interleaver delay to within 1 symbol (as in legacy devices) but is able to use the spatial dimension to gain more error protection.

Aspects of the present invention may be found in an interleaver circuit for processing bits of an input symbol to form N transmit streams each comprising K subsymbols per input symbol. In a representative embodiment of the present invention, each subsymbol may comprise B bits of the input symbol, and each subsymbol may be communicated via an associated subcarrier of an orthogonal frequency division multiplex (OFDM) signal. A representative embodiment in accordance with the present invention may comprise at least one interleaver performing at least one permutation upon bits of the input symbol. The at least one interleaver may function to gain tone separation between adjacent bits of the input symbol by spreading bits of the input symbol across the N transmit streams. The at least one interleaver may comprise a plurality of interleavers. A representative embodiment of the present invention may also comprise a bit to stream allocator.

In a representative embodiment of the present invention, bit k of the input symbol may be mapped to bit i of a first bit sequence according to the formula:

$$i = \frac{BKN}{r}(k \bmod r) + \left\lfloor \frac{k}{r} \right\rfloor$$
$$k = 0, 1, \ldots, BKN - 1$$

wherein r denotes interleaving depth; and wherein $$\left\lfloor \frac{k}{r} \right\rfloor$$

denotes the largest integer not exceeding the value $$\frac{k}{r}.$$

In a representative embodiment of the present invention, bit i of the first bit sequence may be mapped to bit j of a second bit sequence according to the formula:

$$j = s\left\lfloor \frac{i}{s} \right\rfloor + \mathrm{mod}\!\left(i + BKN - \left\lfloor \frac{ri}{BKN} \right\rfloor, s\right)$$
$$i = 0, 1, \ldots, BKN - 1$$

wherein s=max(B/2,1), and wherein r denotes interleaving depth.

A representative embodiment of the present invention may also comprise a block mapper that groups B bits of the second bit sequence to form subsymbols and groups subsymbols into blocks comprising $$\frac{K}{rot}$$

subsymbols, and wherein rot is any integer divisor of K. The blocks of subsymbols may be distributed across the transmit streams according to an index, m, defined by the formula:

$$m=(\text{rot}*q*(N-1)+p)\mod(N*\text{rot})$$

where p=N*(0: rot−1)+q, and where rot denotes any integer divisor of K, q denotes integer values such that $0 \leq q \leq N-1$, N denotes the number of transmit streams having indexes 0 through N−1, and (0:rot−1) denotes the sequence 0, 1, 2, ..., (rot−1).

In a representative embodiment of the present invention, the interleaver circuit may be operable in a mode compliant with the Institute of Electrical and Electronics Engineers (IEEE) 802.11a standard (1999), and the interleaver circuit may be operable in a mode compliant with the Institute of Electrical and Electronics Engineers (IEEE) 802.11g standard (2003).

Further aspects of the present invention may be seen in an interleaver circuit for processing bits of an input symbol for transmission via a plurality of orthogonal frequency division multiplex (OFDM) transmit signals. Such a circuit may comprise a plurality of interleavers for interchanging bits of the input symbol, where each of the interleavers may operate according to an associated permutation. The plurality of interleavers may allocate bits of the input symbol to form subsymbols, and each subsymbol may be associated with a subcarrier of one of the plurality of orthogonal frequency division multiplex (OFDM) transmit signals. The plurality of interleavers may comprise a block mapper for grouping subsymbols into blocks of subsymbols, and the plurality of interleavers may allocate blocks of subsymbols across the plurality of orthogonal frequency division multiplex (OFDM) transmit signals.

Still other aspects of the present invention may be observed in a method of interleaving bits of an input symbol for transmission over a plurality of transmit antennas. In a representative embodiment in accordance with the present invention, each of the transmit antennas may radiate a corresponding one of a plurality of orthogonal frequency division multiplex streams, each comprising a plurality of subcarriers. Such a method may comprise interleaving bits of the input symbol according to at least one permutation, and allocating interleaved bits to sub-symbols. The method may also comprise mapping sub-symbols to blocks, and spreading the blocks across the plurality of transmit antennas using the plurality of orthogonal frequency division multiplex streams, thereby gaining tone separation between adjacent bits of the input symbol. The at least one permutation may be compliant with the Institute of Electrical and Electronics Engineers (IEEE) 802.11a standard (1999), the at least one permutation may be compliant with the Institute of Electrical and Electronics Engineers (IEEE) 802.11g standard (2003). The interleaved bits may be allocated to subsymbols of all subcarriers of one of the plurality of orthogonal frequency division multiplex streams, before being allocated to subsymbols of all subcarriers of another of the plurality of orthogonal frequency division multiplex streams. In a representative embodiment of the present invention, an order of allocation of interleaved bits to bits of subsymbols may alternate for successive subsymbols.

In a representative embodiment of the present invention, the bits of an input symbol may be allocated to all subsymbols for one subcarrier of all of the plurality of orthogonal frequency division multiplex streams, before bits of the input symbol are allocated to all subsymbols of another subcarrier of all of the plurality of orthogonal frequency division multiplex streams. An order of allocation of interleaved bits to bits of subsymbols may alternate as subsymbols are allocated to each of the plurality of orthogonal frequency division multiplex streams.

Additional aspects of the present invention may be seen in a machine-readable storage, having stored thereon a computer program having a plurality of code sections executable by a machine for causing the machine to perform the operations described above.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A wireless device comprising:
   a wireless interface; and
   processing circuitry, the wireless interface and the processing circuitry operable to process bits of an input symbol to form N orthogonal frequency division multiplex (OFDM) transmit streams across K subcarriers, wherein at least one input symbol comprises KN subsymbols, wherein at least one of the KN subsymbols comprises B bits of the input symbol and wherein each subsymbol is communicated via an associated subcarrier of the N transmit streams by:
   interleaving the bits of the input symbol by at least one permutation to form permuted bits;
   grouping permuted bits into subsymbols;
   grouping the subsymbols into blocks of subsymbols; and
   rotating the blocks of subsymbols between the N OFDM transmit streams, wherein N is greater than 1.

2. The wireless device of claim 1, wherein the wireless interface and processing circuitry are further operable to allocate bits of an input symbol to OFDM transmit streams in a mode selected from a plurality of modes.

3. The wireless device of claim 1, wherein the wireless interface and processing circuitry are further operable to map bit k of the input symbol to bit i of a first bit sequence according to the formula:

$$i = \frac{BKN}{r}(k \bmod r) + \left\lfloor \frac{k}{r} \right\rfloor$$
$$k = 0, 1, \ldots, BKN - 1$$

wherein r denotes interleaving depth; and
wherein $$\left\lfloor \frac{k}{r} \right\rfloor$$

denotes the largest integer not exceeding the value $$\frac{k}{r}.$$

4. The wireless device of claim 3, wherein the wireless interface and processing circuitry are further operable to map bit i of the first bit sequence to bit j of a second bit sequence according to the formula:

$$j = s\left\lfloor \frac{i}{s} \right\rfloor + \bmod\left(i + BKN - \left\lfloor \frac{ri}{BKN} \right\rfloor, s\right)$$
$$i = 0, 1, \ldots, BKN - 1$$

wherein s=max(B/2,1); and
wherein r denotes interleaving depth.

5. The wireless device of claim 4, wherein the wireless interface and processing circuitry are further operable to:
group B bits of the second bit sequence to form subsymbols and group subsymbols into blocks comprising $$\frac{K}{rot}$$

subsymbols; and
wherein rot is the number of blocks transmitted via each of the N OFDM transmit streams and is any integer divisor of K.

6. The wireless device of claim 1, wherein the wireless interface and processing circuitry are further operable to distribute the blocks of subsymbols across the N OFDM transmit streams according to an index, m, defined by the formula:

$$m=(rot*q*(N-1)+p) \bmod (N*rot);$$

wherein $p=N*(0: rot-1)+q$; and
wherein rot denotes any integer divisor of K, q denotes integer values such that 0≤q≤N−1, N denotes the number of OFDM transmit streams having indexes 0 through N−1; and (0:rot−1) denotes the sequence 0, 1, 2, . . . , (rot−1).

7. The wireless device of claim 1, wherein the wireless interface and processing circuitry are further operable to be mode compliant with the Institute of Electrical and Electronics Engineers (IEEE) 802.11a standard (1999) and/or successor standards.

8. The wireless device of claim 1, wherein the wireless interface and processing circuitry are further operable to be mode compliant with the Institute of Electrical and Electronics Engineers (IEEE) 802.11g standard (2003) and/or successor standards.

9. The wireless device of claim 1, wherein the wireless interface and processing circuitry are further operable to transmit the N OFDM transmit streams via at least two antennas.

10. The wireless device of claim 9, wherein transmitting the N OFDM transmit streams via at least two antennas is performed via Multiple Input Multiple Output (MIMO) transmit operations.

11. A wireless device comprising:
a wireless interface; and
processing circuitry, the wireless interface and the processing circuitry operable to process bits of an input symbol for transmission via a plurality of orthogonal frequency division multiplex (OFDM) transmit signals by:
for at least two interleaving operations:
interchanging bits of the input symbol according to respective associated permutations;
allocating bits of the input symbol to form subsymbols, each subsymbol associated with a subcarrier of one of the plurality of OFDM transmit signals;
block mapping groups of subsymbols into blocks of subsymbols; and
rotating the blocks of subsymbols between the plurality of OFDM transmit signals.

12. The wireless device of claim 11, wherein the wireless interface and processing circuitry are further operable to allocate bits of an input symbol to OFDM transmit streams in a mode selected from a plurality of modes.

13. The wireless device of claim 11, wherein the wireless interface and processing circuitry are further operable to be mode compliant with the Institute of Electrical and Electronics Engineers (IEEE) 802.11a standard (1999) and/or successor standards.

14. The wireless device of claim 11, wherein the wireless interface and processing circuitry are further operable to be mode compliant with the Institute of Electrical and Electronics Engineers (IEEE) 802.11g standard (2003) and/or successor standards.

15. The wireless device of claim 11, wherein the wireless interface and processing circuitry are further operable to transmit the plurality of OFDM transmit signals via at least two antennas.

16. The wireless device of claim 11, wherein transmitting the plurality of OFDM transmit signals via at least two antennas is performed via Multiple Input Multiple Output (MIMO) transmit operations.

17. A method of operating a wireless device comprising:
processing bits of an input symbol to form N orthogonal frequency division multiplex (OFDM) transmit streams across K subcarriers, wherein at least one input symbol comprises KN subsymbols, wherein at least one of the KN subsymbols comprises B bits of the input symbol and wherein each subsymbol is communicated via an associated subcarrier of the N transmit streams, the processing by:
interleaving the bits of the input symbol by at least one permutation to form permutated bits;
grouping permutated bits into subsymbols;

grouping the subsymbols into blocks of subsymbols; and rotating the blocks of subsymbols between the N OFDM transmit streams, wherein N is greater than 1.

18. The method of claim 17, further comprising transmitting the N OFDM transmit streams via at least two antennas.

19. The method of claim 17, further comprising transmitting the N OFDM transmit streams via at least two antennas is performed via Multiple Input Multiple Output (MIMO) transmit operations.

20. The method of claim 17, wherein the at least one permutation is compliant with at least one of:

the Institute of Electrical and Electronics Engineers (IEEE) 802.11a standard (1999) and/or successor standards; and the Institute of Electrical and Electronics Engineers (IEEE) 802.11g standard (2003) and/or successor standards.

* * * * *